United States Patent [19]

Miyoshi et al.

[11] Patent Number: 5,493,455
[45] Date of Patent: Feb. 20, 1996

[54] RECORDING APPARATUS USING A TAPE CASSETTE WITH A MEMORY

[75] Inventors: Tsutomu Miyoshi, Neyagawa; Yutaka Ohta; Masako Sawada, both of Hirakata, all of Japan

[73] Assignee: Matsushita Electric Industrial Co., Ltd., Osaka, Japan

[21] Appl. No.: 230,235

[22] Filed: Apr. 20, 1994

[30] Foreign Application Priority Data

Apr. 20, 1993 [JP] Japan .................................. 5-092859
Dec. 3, 1993 [JP] Japan .................................. 5-339593

[51] Int. Cl.$^6$ .............................. G11B 15/04; G11B 5/09
[52] U.S. Cl. .................................. 360/60; 360/48
[58] Field of Search ............................. 360/60, 46, 14.2, 360/14.3, 27, 48

[56] References Cited

U.S. PATENT DOCUMENTS 5,055,947 10/1991 Satoh ........................................ 360/66

FOREIGN PATENT DOCUMENTS 2043982 10/1980 United Kingdom .
91/02355 2/1991 WIPO .
93/04473 3/1993 WIPO .

Primary Examiner—Andrew L. Sniezek
Assistant Examiner—W. Chris Kim
Attorney, Agent, or Firm—Wenderoth, Lind & Ponack

[57] ABSTRACT

A memory is provided in a tape cassette and it consists of a program information area for recording information on each program recorded on a tape and a tape information area for recording information on the entire tape. If this tape cassette is used by a video cassette recorder having a full function to drive the memory and by a video cassette recorder having a limited function to drive it, the program information recorded in the memory is consistent with the programs actually recorded on the tape. For example, a tape erasing prevention flag is set in the tape information area, while a program erasing prevention flag is set for each program in the program information area. In a different example, a tape inconsistency flag is set in the tape information area, while a program inconsistency flag is set for each program in the program information area. The data in the memory can be corrected by using such flags according to the programs actually recorded on the tape.

10 Claims, 28 Drawing Sheets

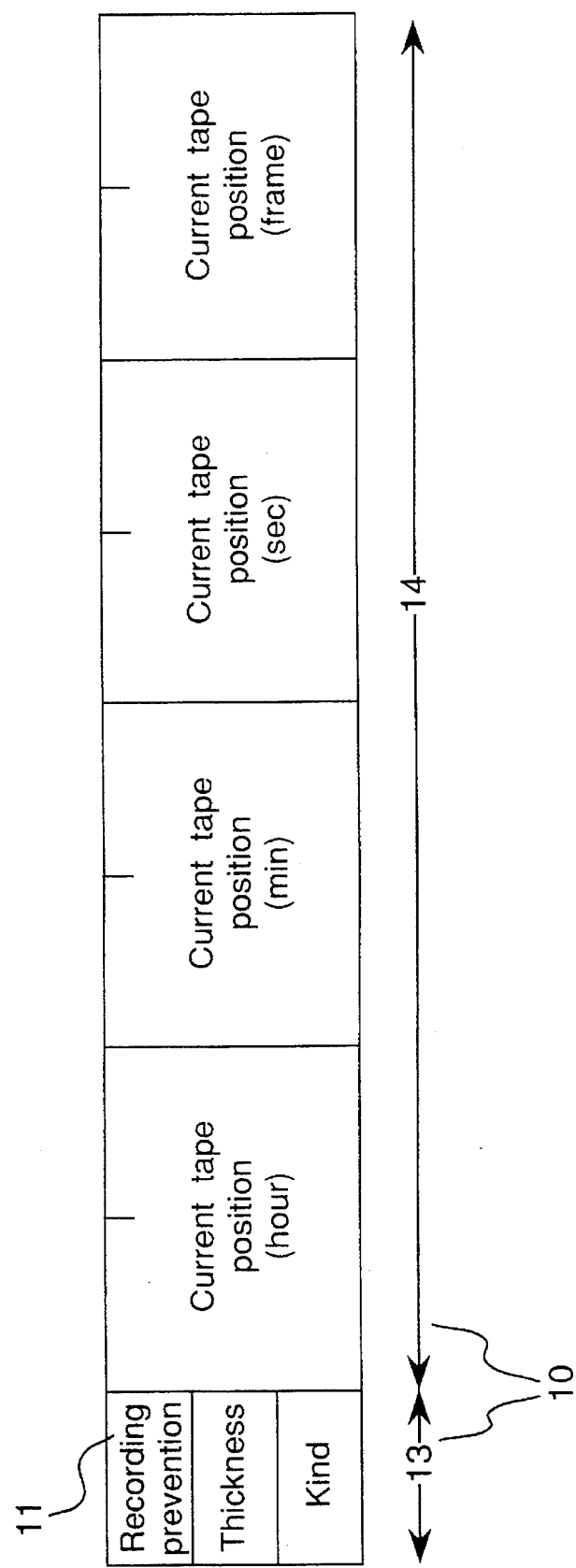

Fig.8

| Recording prevention | Start tape position (hour) | Start tape position (min) | Start tape position (sec) | Start tape position (frame) |
|---|---|---|---|---|
| | End tape position (hour) | End tape position (min) | End tape position (sec) | End tape position (frame) |
| Channel | Recording time (month) | Recording time (day) | Recording time (hour) | Recording time (min) |

RECORDING APPARATUS USING A TAPE CASSETTE WITH A MEMORY

BACKGROUND OF THE INVENTION

1. Field of the Invention

The present invention relates to an apparatus for recording data with a tape cassette including a memory.

2. Description of the Prior Art

Recently, video cassette recorders and audio cassette recorders for recording a tape cassette have become popular in many homes. However, they have problems on operation, search and the like when compared with apparatuses using a disk medium. Then, it is demanded for example to facilitate management and search on recorded programs.

A bar code is already available to manage data recorded on a cassette tape for a video cassette recorder. That is, a bar code is attached to a video tape in order to discriminate a tape cassette in order to represent recorded programs. The bar code is read by a sensor installed in a video cassette recorder and read data are stored in a memory also installed in the recorder. Then, recorded programs in a tape cassette can be managed by referring the data in the memory. However, this management system has a problem in that there is no compatibility between video cassette recorders.

Belgian patent Nos. 191395 and 191469 filed on Oct. 27, 1978 and Oct. 31, 1978 disclose a cassette tape recorder for a tape cassette having a memory device therein. When such a tape cassette is inserted in a cassette tape recorder, the memory device is connected to a controller of the recorder. The recorder has a detector which can detect a tape position and stores an instantaneous tape position in the memory device when a cassette tape stops. The memory device comprises memory element blocks each for storing a plurality of tape positions. Then, the recorder can manage tape position data stored in the memory device. Therefore, the cassette tape can be used in any memory device. Therefore, the cassette tape can be used in any cassette tape recorder which has a device to use such a cassette tape.

Such a tape cassette may be set in a tape recorder which cannot use the memory device. In such a case, the Belgian patents disclose that the cassette tape itself erases all data stored in the memory device and displays a warning message. However, it is desirable that recording and reproduction are possible by protecting data stored in a memory device in such a tape cassette as much as possible even when it is used to be recorded by a tape recorder which cannot use such a memory device for using the data stored therein.

SUMMARY OF THE INVENTION

An object of the present invention is to provide a recorder which can ensure consistency between data stored in a memory device and programs recorded in the tape when a cassette tape with a memory device is used by recorders having different abilities for using data stored in the memory device.

In the present invention, a tape cassette wherein a memory is provided is used in a recording apparatus. The memory has a program information area for storing information on particular programs recorded in a tape and a tape information area for storing information on an entire tape in the tape cassette.

In one aspect of the present invention, the program information area in a memory provided in a tape cassette includes an area for storing program-erasing-prevention information on whether prevention to erase a particular program on each of recorded programs is set, while the tape information area includes an area for storing tape-erasing-prevention information on whether or not prevention to erase all recorded programs is set. A first recording apparatus comprises a memory writer and a memory reader for writing and reading tape information and program information to and from the memory. A detector detects the program-erasing-prevention information in the memory by way of the memory reader. A setter sets prevention to erase all programs in the tape information area by way of the memory writer when the detector detects that prevention to erase a program is set on at least one of the recorded programs in the program information area. On the other hand, a resetter resets prevention to erase all programs in the tape information area by way of the memory writer when the detector detects that prevention to erase a program is set on all the recorded programs in the program information area.

On the other hand, a second recording apparatus which uses the tape cassette wherein a memory is provided comprises a memory reader for reading data from the memory. A detector detects the tape-erasing-prevention information stored in the memory by way of the memory reader. Recording is prevented when recording is instructed by a user if the detector detects that prevention to erase all programs is set in the tape information area. Then, when the tape cassette is used in the second recording apparatus without the capability of reading and writing data from and to the program information area, the program information in the memory can be protected.

In a second aspect of the present invention, a first recording apparatus records a program and a time data and uses a tape cassette wherein a memory is provided. The memory is similar to the above-mentioned one except that the program information area includes an area for storing a program inconsistency flag which is set or reset for each of recorded programs according as a content of a recorded program coincides or doesn't coincide with the information on the recorded program in the tape and that the tape information area includes an area for storing a tape inconsistency flag which is set or reset according as the program inconsistency flag operates correctly or not. The first recording apparatus access the memory by a memory writer and a memory reader. A detector detects the tape inconsistency flag in the memory. A setter sets the program inconsistency flag for each recorded program when the detector detects that the tape inconsistency flag is set, while a resetter resets the tape inconsistency flag after the setter sets the program inconsistency flag.

In a third aspect of the present invention, a tape inconsistency flag is recorded in the tape information area, while a program inconsistency flag is recorded for each program in the program information area. The program inconsistency flag is set or reset for each of recorded programs according as a content of a recorded program coincides or doesn't coincide with the information on the recorded program in the tape, while the tape inconsistency flag is set or reset according as the program inconsistency flag operates correctly or not. When a program is recorded on a tape, a check is made as to whether or not an overwrite occurs. If an overwrite is not detected, the program is recorded in a region which has not yet been recorded. If an overwrite is detected, the program information for programs to be overwritten is corrected as actually recorded. Then, the program inconsistency flag for each recorded program is reset.

In a fourth aspect of the present invention, when the tape inconsistency flag is detected as being set, the program information on programs recorded in a tape is corrected according to programs actually. First, a top position of the program is detected by detecting a cue signal or a discontinuity of time data. Then, the program information is corrected according to detected time data. Next, the tape inconsistency flag is reset.

In an fifth aspect of the present invention, a program inconsistency flag is recorded in the program information area in the memory, while a tape inconsistency flag is recorded in the program information area in the memory. The program inconsistency flag is set or reset for each of recorded programs according as a content of a recorded program coincides or doesn't coincide with the information on the recorded program in the tape, while the tape inconsistency flag is set or reset according as the program inconsistency flag operates correctly or not. When the tape inconsistency flag is detected as being set, data correction is performed. In the data correction, a cue control signal recorded at a top of each of the recorded programs is detected and the program information in the program information area is corrected as actually recorded for programs on which a cue signal is detected, according to time data on programs already recorded on the tape. After data correction, the program inconsistency flag is reset.

In a sixth aspect of the present invention, data correction is performed on programs on which data correction is found to be needed. For programs on which the program inconsistency flag is detected to be set, the program information in the program information area is corrected as actually recorded by detecting time data on the programs by detecting a cue signal or time data discontinuity. Next, the program inconsistency flags are reset for programs on which the data is corrected.

An advantage of the present invention is that a tape cassette with a memory for management data is recorded by a recorder which does not have full function to use the memory means.

Another advantage of the present invention is that the management data in a memory in a tape cassette can be corrected according to programs actually recorded on a tape.

A third advantage of the present invention is that the inconsistency of the program information in a memory in a tape cassette with the content of programs recorded in a tape can be checked easily.

BRIEF DESCRIPTION OF THE DRAWINGS

These and other objects and features of the present invention will become clear from the following description taken in conjunction with the preferred embodiments thereof with reference to the accompanying drawings, and in which:

FIG. 6 is a schematic memory map in the memory of a tape cassette;

FIG. 8 is a schematic memory map in the memory of a tape cassette;

DETAILED DESCRIPTION OF THE PREFERRED EMBODIMENTS

Figure 1A:
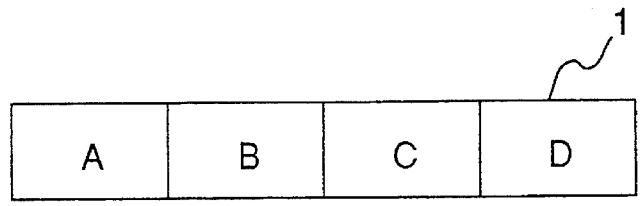
FIGS. 1A and 1B are schematic diagrams of recorded programs in a tape and program information written to a memory provided in a tape cassette, respectively.
Figure 1B:
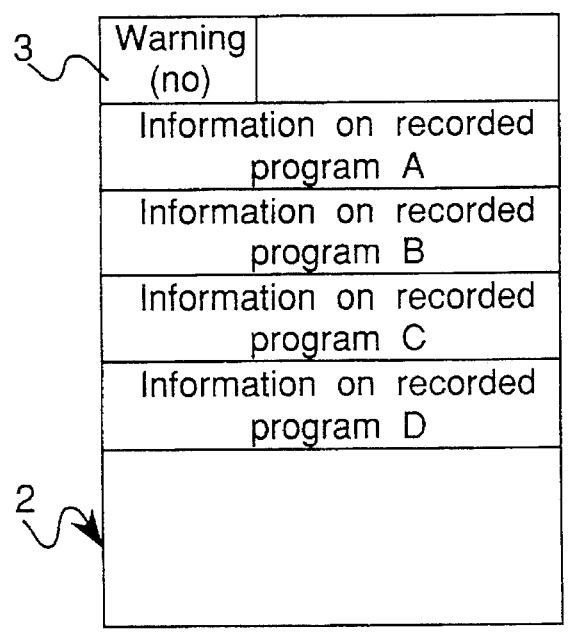

Referring now to the drawings, wherein like reference characters designate like or corresponding parts throughout the views, embodiments of the present invention will be explained below. In the present invention, a tape cassette has a memory therein and the memory is used to manage or search programs recorded on the tape cassette. The memory may include an area for program information for managing information on each program recorded in a tape and an area for tape information for managing an entire tape. Then, if a recorder can access the memory provided in such a tape cassette, the recorder can manage recording, playback and the like according to various information stored in the memory.

If a recorder may have a function to use the memory actively by reading and writing the information from and to the memory, the information in the memory can be fully used for management. If programs are recorded in a tape cassette by such a recorder having functions to use the memory fully (hereinafter referred to as a full function recorder), the tape cassette can also be accessed by another full function recorder. However, there will be various models of a recorder which can access such a memory in a tape cassette in various ways. For example, such a tape cassette may be used for a different recorder which has a limited function to use the memory (hereinafter referred to as a limited function recorder). Then, it is necessary for program information in a memory in a tape cassette be protected. For example, it is necessary for that the program information not to lose consistency of data even if the tape cassette is used in various models of a recorder. If this is guaranteed, a tape cassette with a memory can be used in various models.

Before explaining embodiments of the present invention, a comparison example is explained below in order to explain problems on data stored in a memory in a tape cassette, by using the above-mentioned two types of video cassette recorders (VCR). A memory 2 in a tape cassette has a plurality of addresses and consists of a first area 3 at a first address for storing warnings and a second area for storing program information. It is assumed that when a tape cassette is recorded in a limited function VCR, the tape cassette itself sets a warning in the first area, and that if a warning is set in the first area, all program information in the second area is erased when the tape cassette is set in a full function VCR.

FIGS. 1A–4B show program information stored in a memory 2 in a tape cassette and a content of programs actually recorded on a tape 1. In an example shown in FIG. 1A, four programs A–D are recorded successively on a tape 1 by a full function VCR. As shown in FIG. 1B, the first address is an information area for storing a warning flag 3, and program information of the programs A–D are stored successively after the flag 3. The content of the flag 3 is "no" because the programs are recorded by a full function VCR.

Figure 2A:
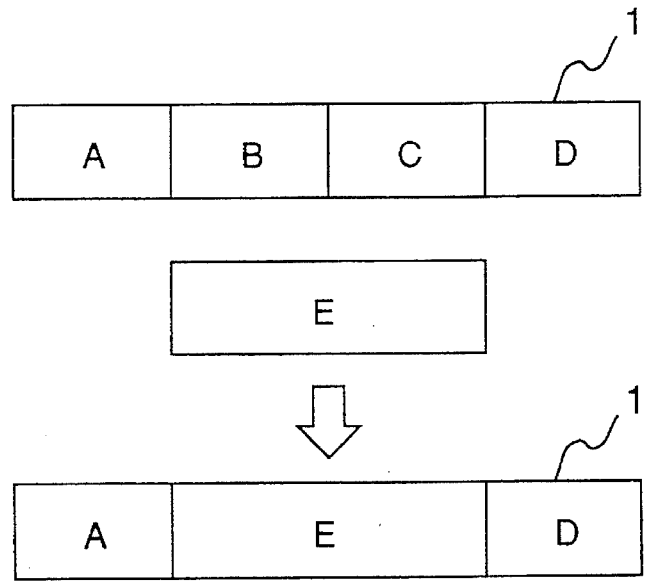
FIGS. 2A and 2B are schematic diagrams of recorded programs in a tape and program information written to the memory provided in the tape cassette, respectively, wherein a program is recorded with a limited function video cassette recorder.
Figure 2B:
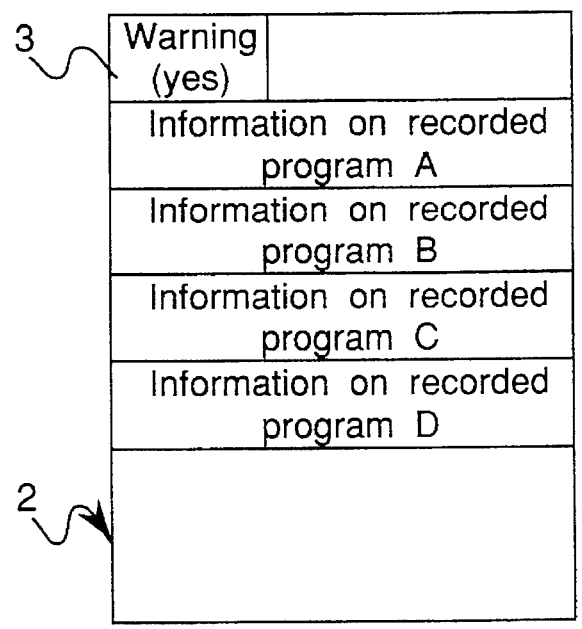

FIG. 2A shows a situation when the tape cassette is set in a limited function VCR and a program E is recorded on the tape 1 to overwrite from the start of the program B to the end of the program C. Because the tape cassette is set in a limited function VCR, a warning information 3 is set as "yes" as shown in FIG. 2B, but the contents of program information in the second area are not updated because the limited function VCR cannot update them.

Figure 3:
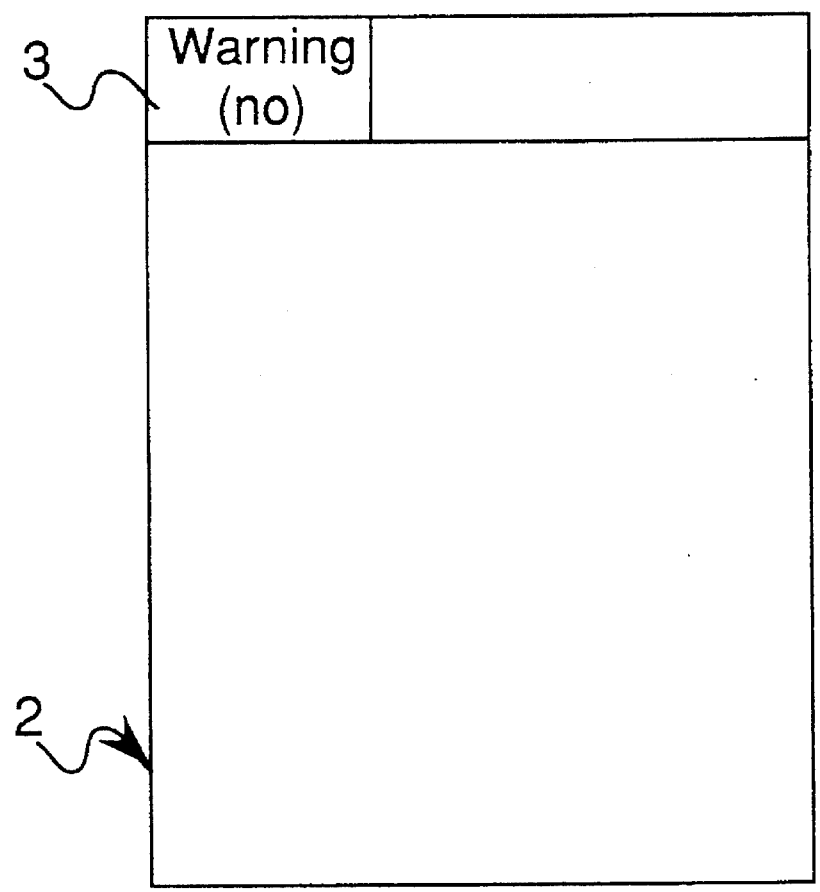
FIG. 3 is a schematic diagram of program information written to the memory provided in the tape cassette.
Figure 4A:
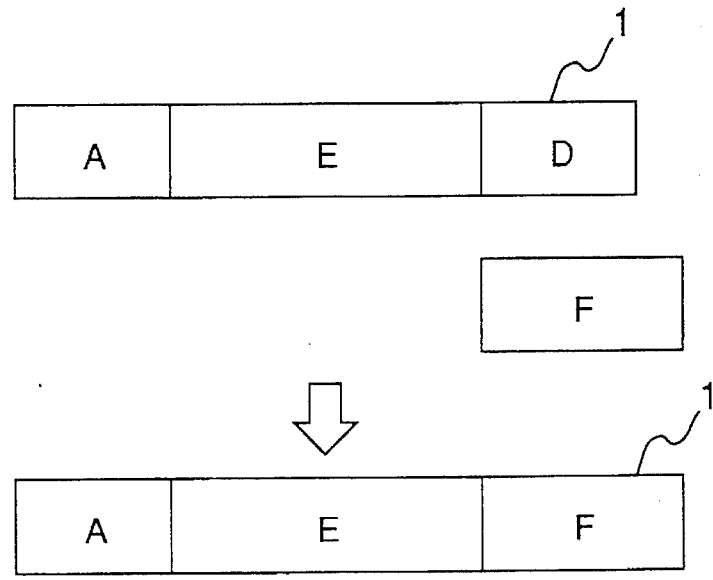
FIGS. 4A and 4B are schematic diagrams of recorded programs on a tape and program information written to the memory provided in the tape cassette, respectively, wherein a program is recorded with a full function video cassette recorder.
Figure 4B:
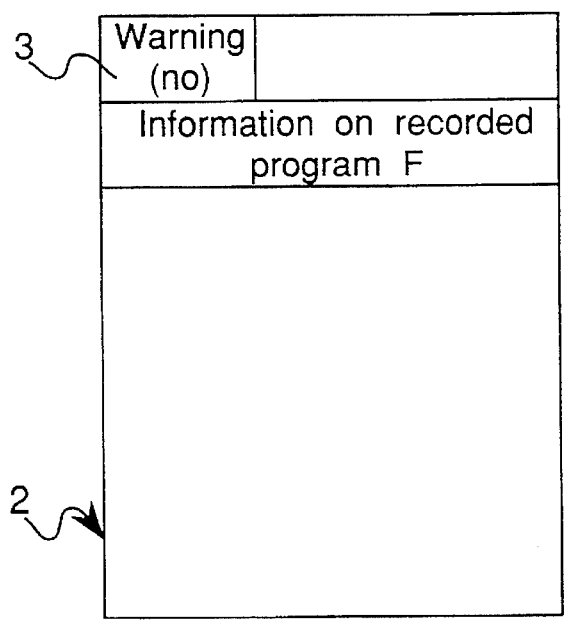

When the tape cassette 1 is set next in the full function VCR, the VCR detects that the warning flag is set. This means that the program information in the memory device 2 may include an error. Then, the full function VCR erases all program information and resets the warning as "no" as shown in FIG. 3. If a new program F is recorded by overwriting from the top of the program D, as shown in FIG. 4A, a program information on the program F is written as shown in FIG. 4B as if the program F is recorded in a new tape 2 because there is no data after the first area 3.

Therefore, ther is a problem in that the program information cannot exclude a possibility that there are more recorded programs in the tape besides programs described in the memory 2. Then, it is desirable that programs actually recorded on a tape be consistent with program information recorded in the memory even if a tape cassette is used in various kinds of VCRs. For example, if a full function VCR can designate a program which is inhibited from being erased on a tape, it is desirable that the program cannot be erased even if the tape cassette is used in a limited function VCR.

Figure 5A:
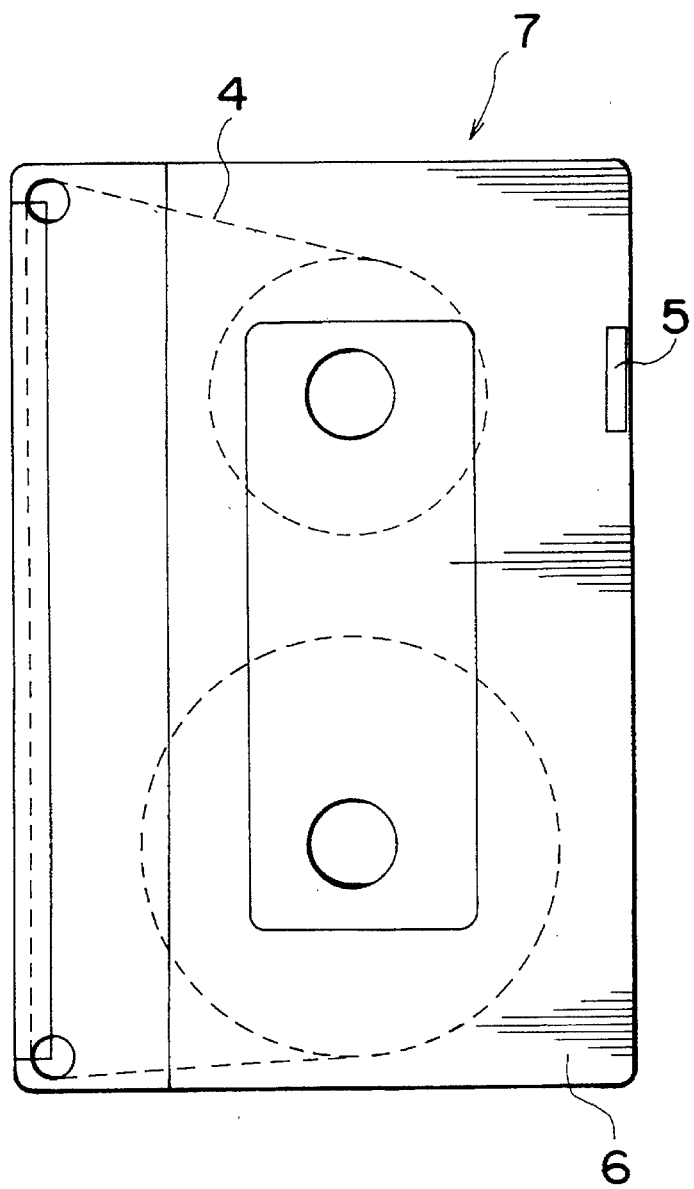
FIGS. 5A and 5B are a plan view and a back view of a tape cassette with a memory.
Figure 5B:
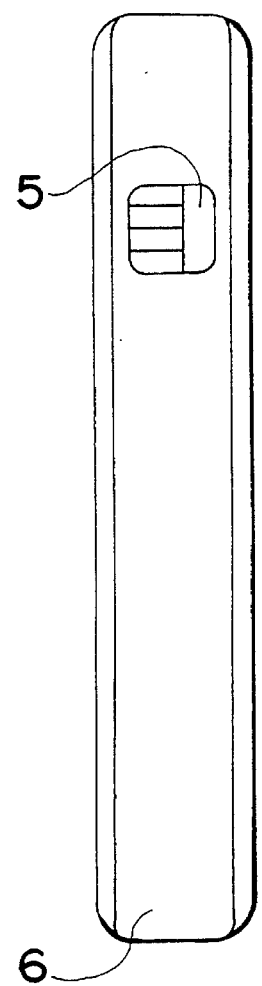

Next, a first embodiment of the present invention is explained. FIGS. 5A and 5B illustrate a tape cassette 7 with a memory 5 provided therein. The tape cassette 7 is similar to a prior art tape cassette except for the memory 5. A video tape 4 is contained in a cassette half 6 including a tape guide mechanism. The memory 5 is a nonvolatile memory such as an EEPROM and it has a first area for storing tape information and a second area for storing program information. The memory 5 is equipped at a back side of the cassette half 6, and a connector or terminal (not shown) is provided at the cassette half 6 for connecting electrical power lines and signal lines to the memory 5. A video cassette recorder which can access the memory 5 has a connector 48 (FIG. 9), 52 (FIG. 15) for connecting to the memory 5.

Figure 7:
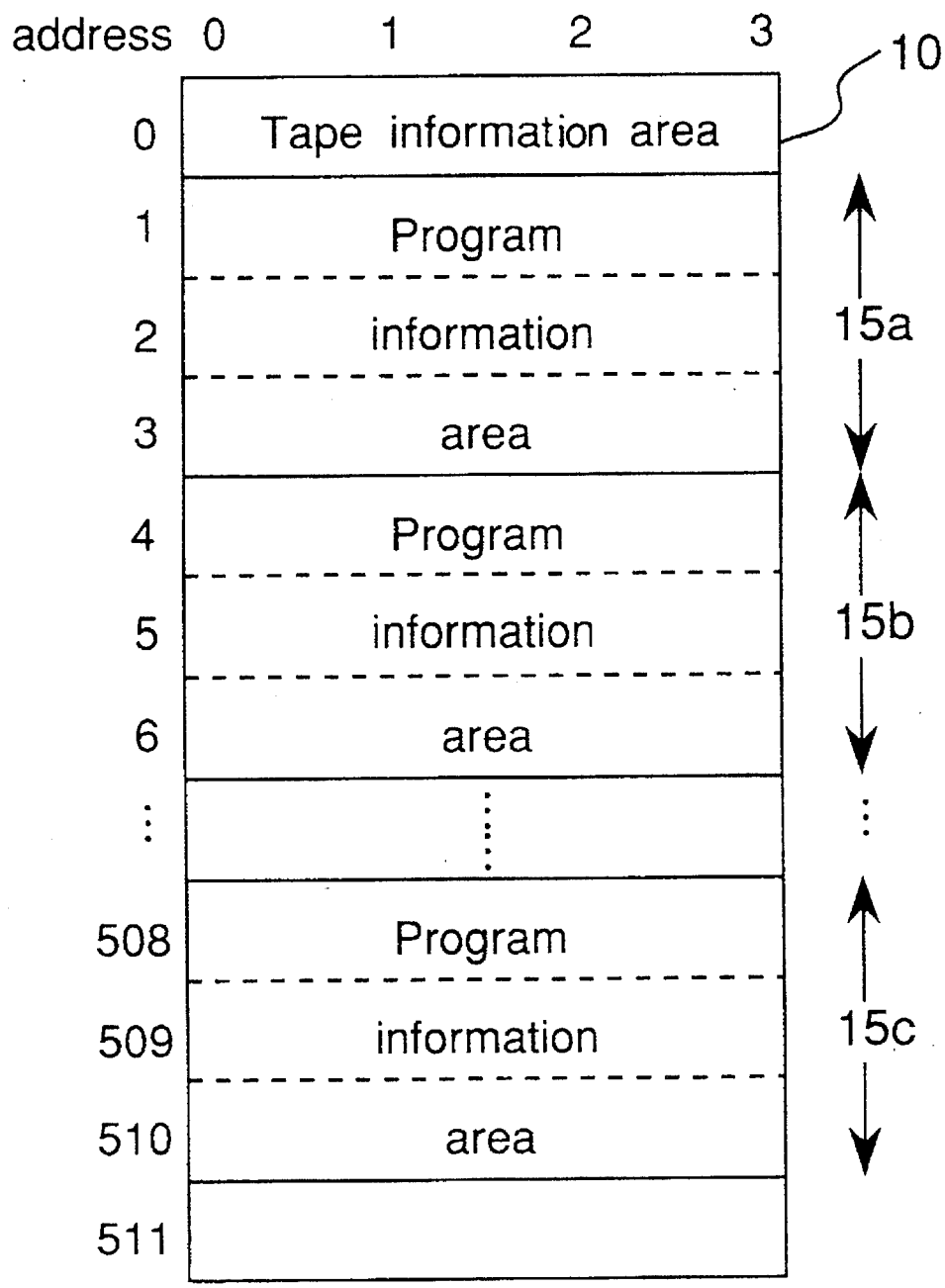
FIG. 7 is a schematic memory map in the memory of a tape cassette.

The memory 5 is for example a semiconductor memory hving 2 kbytes of storage capacity. FIGS. 6–8 show memory maps for illustrating storage data in the memory 5. An address is expressed as an 11-bit data word; the abscissa denotes the lower two bits while the ordinate denotes the upper nine bits. The memory 5 consists of a first area for storing tape information and a second area for storing program information. As shown in FIG. 7, the tape information is stored in an area 10 at address "0" of the upper nine bits of the address, while the program information is stored in areas 15a, 15b, . . . , 15c at addresses "1"–"510" of the upper nine bits every three addresses.

As shown in FIGS. 6 and 7, the area 10 at address "0" for tape information is divided into an area 13 for recording information on the tape cassette itself and an area 14 for recording a current tape position. The area 13 stores an attribute of video tape, recording conditions such as a model of the VCR and the like. For example, in an example shown in FIG. 6, it stores recording prevention flag 11, tape thickness, kind of tape, playback prevention flag (not shown) and the like. A current tape position is recorded in the area 14 as to hour, minute, second and frame number when a tape cassette 7 is unloaded from a VCR after recording or playback.

As shown in FIG. 7, the area for storing program information consists of areas 15a, 15b, . . . , 15c each for recording information on a program when the program is recorded with a full-function VCR. As shown in detail in FIG. 8, a first area 16 in one of the areas 15a, 15b, . . . , 15c stores program erasing prevention information 17, channel information and the like. An area 19 following the area 18 stores a start tape position and an end tape position of programs registered in the areas 15a, 15b, . . . , 15c in the units of hour, minute, second and frame number. Further, in an area 20 after the area 19, a recording time on the programs registered in the area 15 is stored in the units of months, days, hours and minutes.

Figure 9:
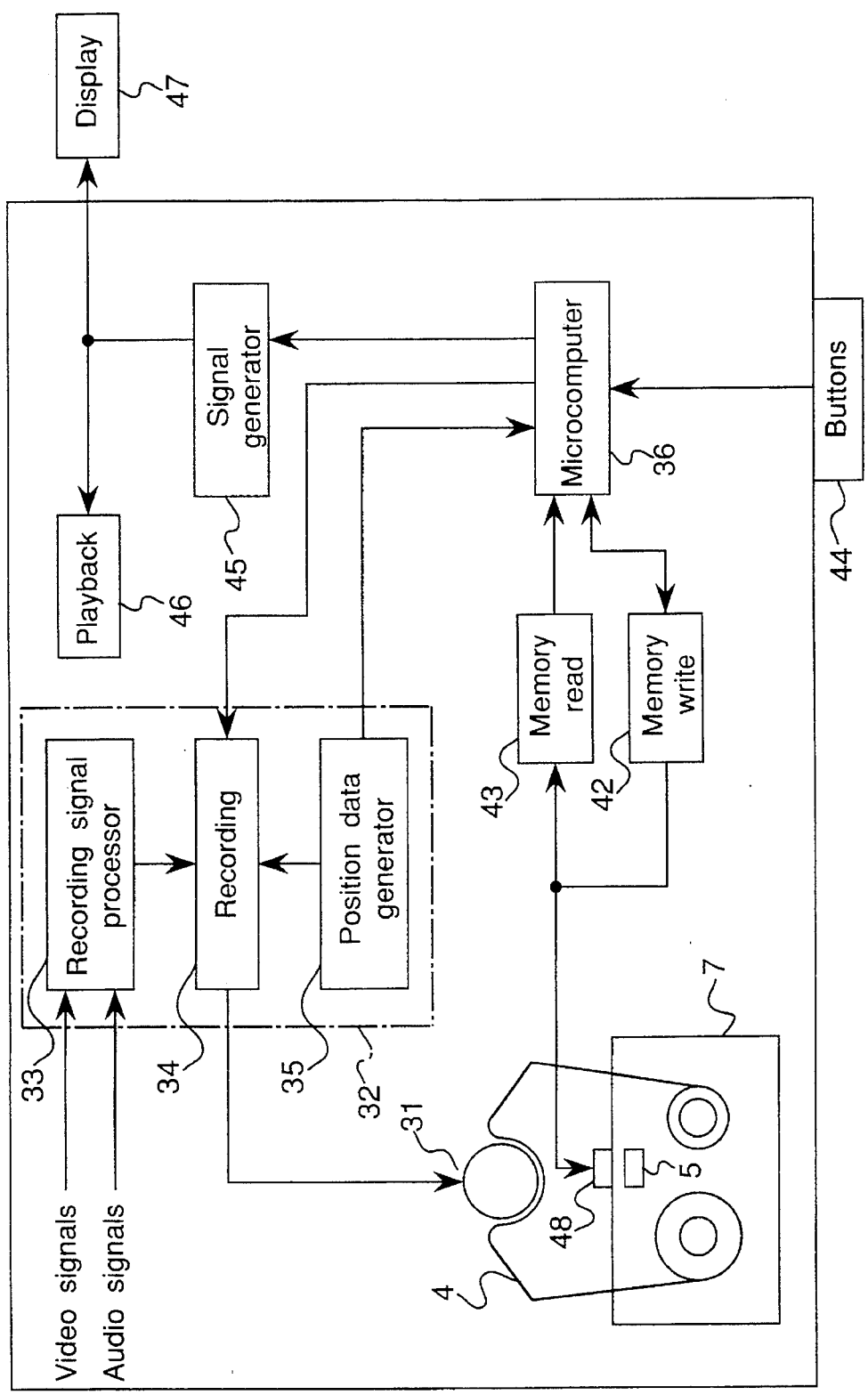
FIG. 9 is a block diagram of a main part of a full function video cassette recorder in accordance with a first embodiment of the present invention.

FIG. 9 shows a diagram of a main part of a video cassette recorder of the first embodiment. The tape cassette 7 can be set in a video cassette recorder (VCR). The VCR includes a signal processing circuit for recording and reproducing video signals, a scan mechanism having a rotating drum and a fixed drum for scanning a tape 5 and a mechanism for loading and unloading a tape cassette, similarly to a prior art VCR. A recording head 31 is provided at the rotating head. Video signals and audio signals to be recorded are received by a recording controller 32 and processed by a recording signal processor 33, while and a tape position data is generated by a position data generator 35. A recording circuit 34 superposes the tape position data on the video and audio signals. The recording circuit 34 sends signals to be recorded to the recording head 31. On the other hand, a microcomputer 36 receives input signals from an input device such as buttons 44 provided on the exterior of the recorder. It also send control signals through a signal generator 45 to a playback system 46 and to a display unit 47. The playback system 46 is not a subject of the present invention and it is not explained further.

A connector 48 is provided to access the memory 5 in the tape cassette 7, and the memory 5 is accessed by a memory write circuit 42 and a memory read circuit 43 for writing and reading data to and from the memory 5; the microcomputer 36 controls the write and read circuits.

Figure 10:
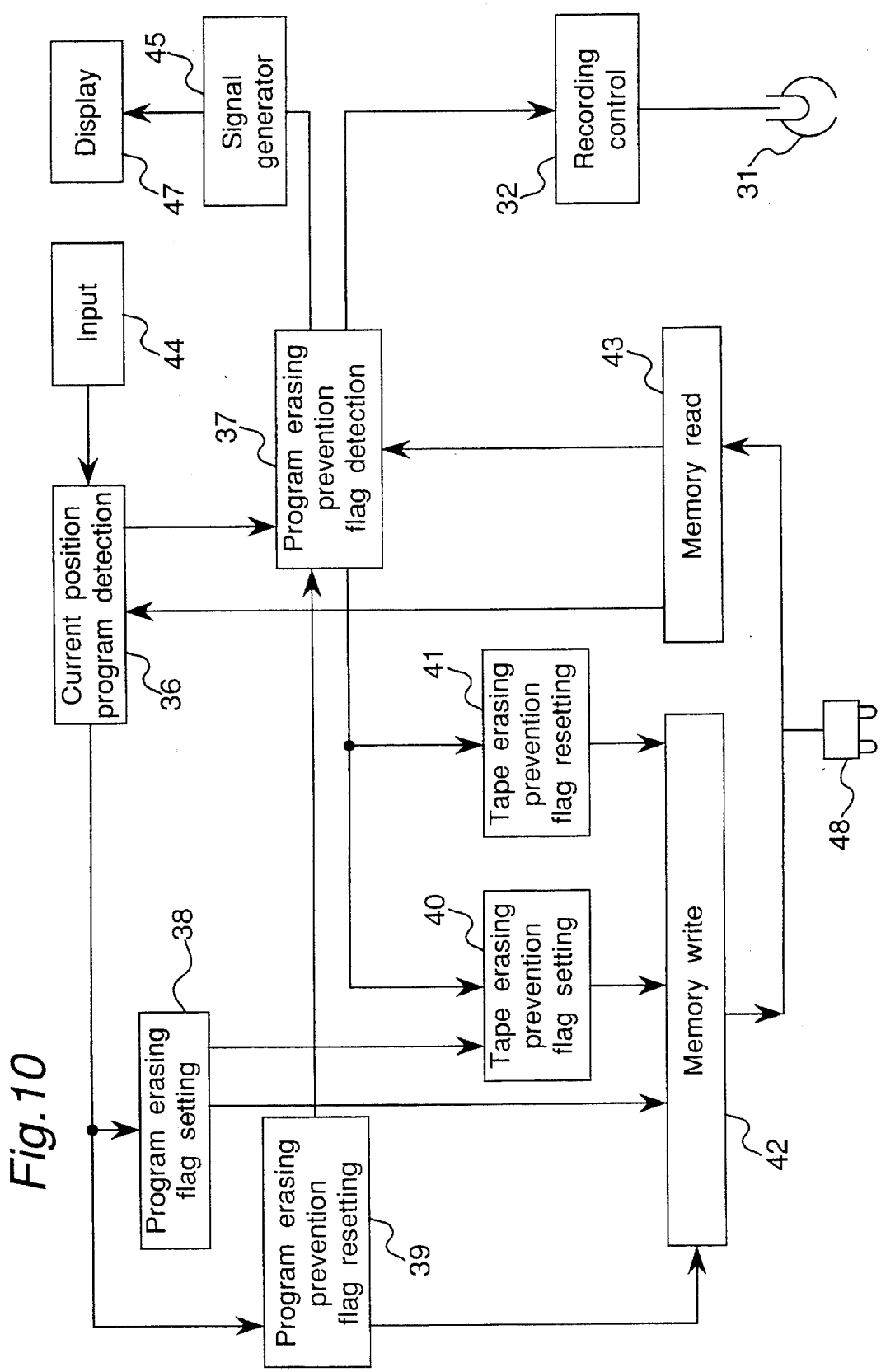
FIG. 10 is a block diagram of the main part of the video cassette recorder.

FIG. 10 shows a block diagram of a main part of the video cassette recorder wherein various functions performed by the microcomputer 36 are represented as blocks 36–41 instead of the microcomputer 36. A part of the information read by the memory read circuit 43 from the memory 5 is sent to a detector 36 for detecting a current position program and to a detector 37 for detecting a program erasing prevention flag.

The detector 36 for detecting a current position program compares a start tape position and an end tape position recorded in the memory 5 with a current tape position recorded in the memory 5 when a video tape stops or with a tape position received from the position data generator 32 when a program is being recorded, to detect a program including the current tape position. The detected current tape position is sent to the detector 37 for detecting a program erasing prevention flag, a setter 38 for setting a program erasing prevention flag, and a resetter 39 for resetting a program erasing prevention flag.

The detector 37 for detecting a program erasing prevention flag detects the status of the program erasing prevention flag of a program detected by the detector 36 for detecting a current position program. The result is sent to the recording control circuit 32, a resetter 40 for setting a tape erasing prevention flag, a resetter 41 for resetting a tape erasing prevention flag and the display unit 47.

The setter 38 for setting a program erasing prevention flag sets a program erasing prevention flag of a program detected by the detector 36 for detecting a current position program in a status to inhibit erasing by way of the memory write circuit 42. Then, it reports to the setter 40 for setting a tape erasing prevention flag that the program erasing prevention flag is set.

The resetter 39 for resetting a program erasing flag resets a program erasing prevention flag of a program detected by the means for detecting a current position program by way of the memory write circuit 42 in a status of erasing permission. Then, it reports to the detector 37 for detecting a program erasing prevention flag.

The setter 40 for setting a tape erasing prevention flag sets a tape erasing prevention flag by way of the memory write circuit 42 in a status of erasing prevention according to instructions from the detector 37 for detecting a program erasing prevention flag and the setter 38 for setting a program erasing prevention flag. When the setter 38 sets a program erasing prevention flag in a status of erasing prevention, a tape erasing prevention flag is always set.

The resetter 41 for resetting a tape erasing prevention flag resets a tape erasing prevention flag in a status of erasing prevention by way of the memory write circuit 42 according to an instruction from the detector 37 for detecting a program erasing prevention flag.

The display unit 47 displays that erasing is inhibited, according to an instruction from the detector 37 for detecting a program erasing prevention flag. The recording control circuit 32 cooperates with the display unit 47 to inhibit recording operation.

A user provides an instruction by way of the buttons 43 or input device and the instruction is sent to the detector 36 for detecting a current position program. The instruction includes setting or resetting of a program erasing prevention flag, and the starting and stopping of the recording operation.

Figure 11:
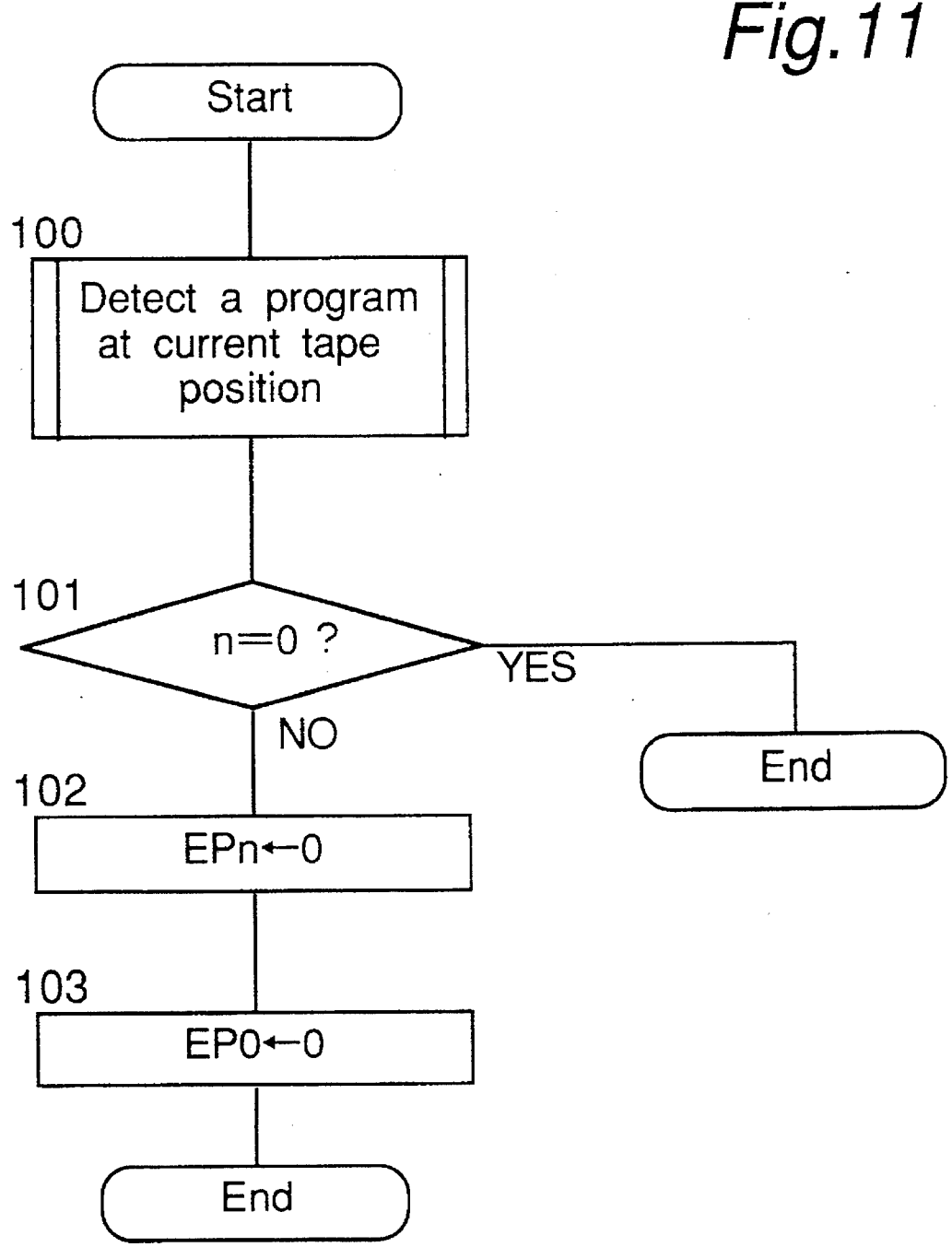
FIG. 11 is a flowchart of setting erasure prevention.
Figure 12:
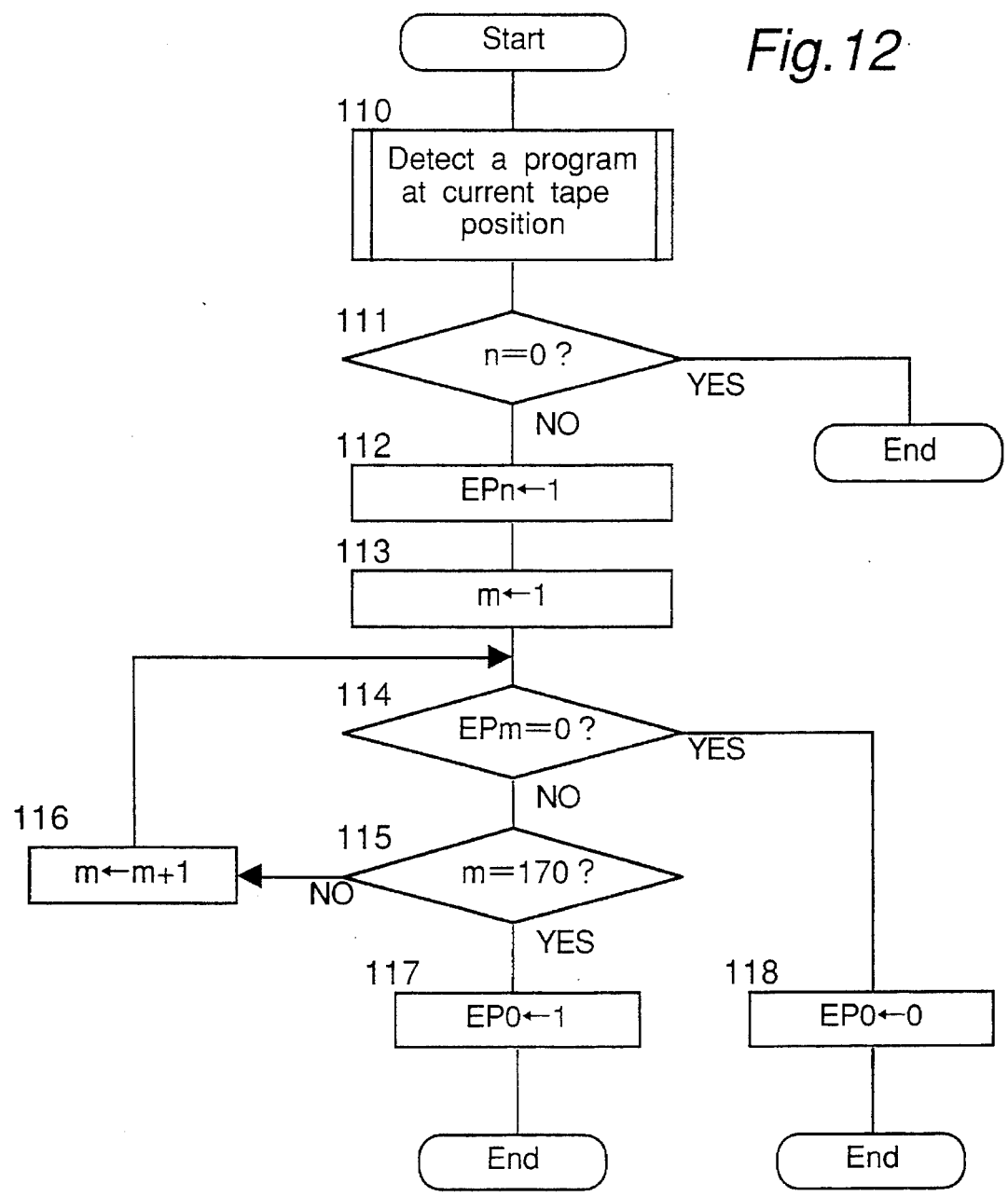
FIG. 12 is a flowchart of resetting erasion prevention.
Figure 13:
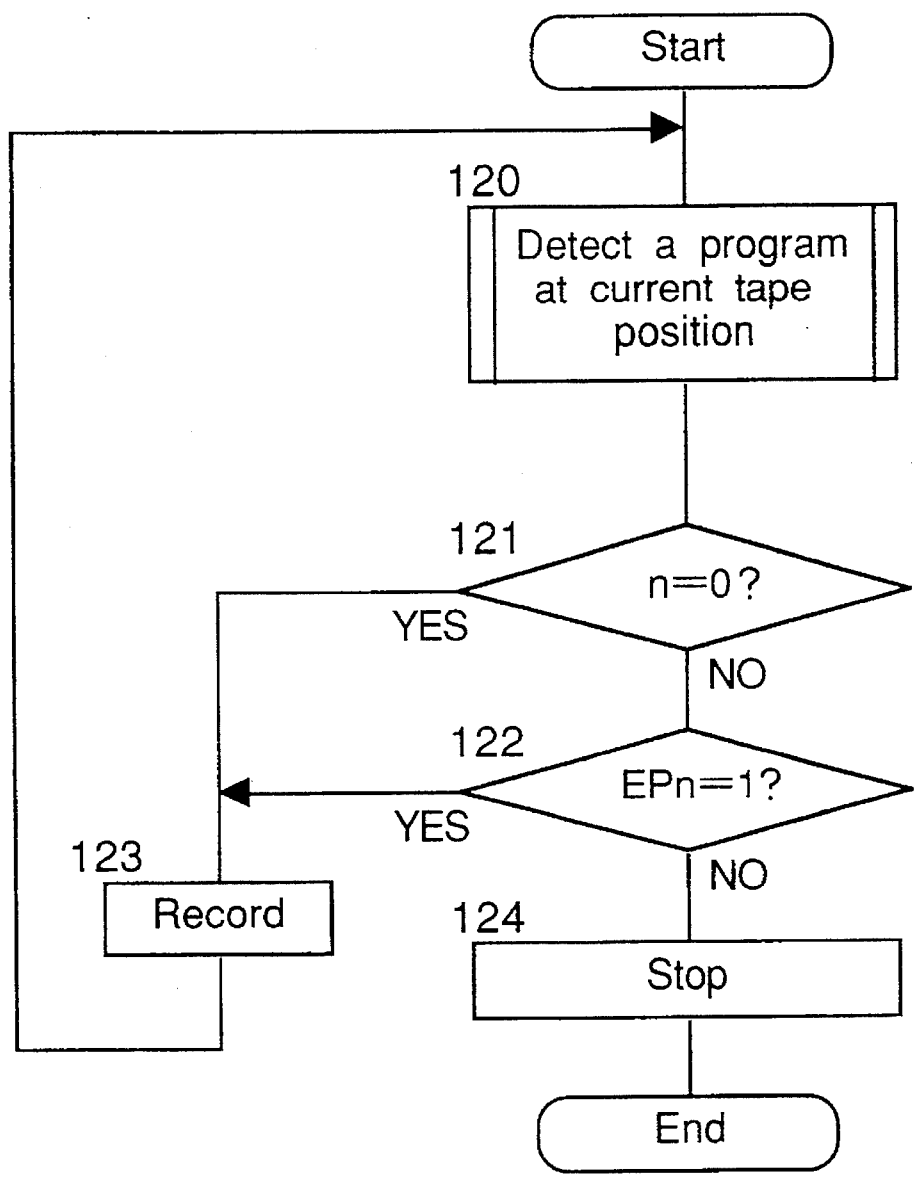
FIG. 13 is a flowchart of recording.

The microprocessor 36 operates according to instructions from the buttons 44 as operated by a user. A main flow of the microprocessor 36 branches according to an instruction given by a user, but the flowchart of the branching has been omitted for simplicity. FIGS. 11–13 are flowcharts respectively showing when a request of setting erasing prevention for a current position program, a request of resetting erasing prevention for a current position program, and when a request of recording are received from the buttons 44.

Before explaining the flowcharts, flags and variables used therein are explained first. A variable "n" has an integral value (0≦n≦170) which represents a program number detected by the detector 36 for detecting a present position program. It increases from 1 as n=1, 2, . . . with an increase in an address of an area storing a program information. If n=0, this means that no program including a current tape position exists in the program information area 15. A variable "m" is a positive integer (0<m) for a counter used to detect setting of program erasing prevention flags of recorded programs by the program erasing prevention flag detector 37. Erasing prevention flags EPn and EPm for n-th and m-th programs show the setting of erasing prevention information 17 on n-th and m-th programs recorded in the program information area 15 in the memory 5. For example, if EPn=0, an n-th program is set to prevent erasing, while if EPn=1, an n-th program is set to allow erasing. On the other hand, if EP0=0, the tape erasing prevention information area 11 is set to prevent erasing, while if EP0=1, the area 11 is set to allow erasing.

When a request by a user is received to set erasing prevention for a current position program, a flow as shown in FIG. 11 starts. When such a request is received, a program at a current tape position or the variable "n" is first detected (step S100), as will be explained in detail in FIG. 14. This step corresponds to the detector 36 for detecting a current position program. Next, it is decided if n=0 or not (step S101). If the decision is YES, the program ends because erasing prevention cannot be set for a program at a current tape position. On the contrary, if it is decided that n≠0 (NO at step S101), a flag EPn is set as "0" (step S102). This step corresponds to the setter 38 for setting a program erasing prevention flag. Then, because a program erasing prevention flag is set for at least one program, a flag EP0 is set as "0" for preventing erasing of the tape (step S103). This step corresponds to the setter 40 for setting a tape erasing prevention flag. Then, the flow ends.

When a request by a user is received to reset erasing prevention for a current position program, a flow as shown in FIG. 12 starts. When such a request is received, a program at a current tape position or the variable "n" is first detected (step S110), as will be explained in detail in FIG. 14. This step corresponds to the detector 36 for detecting a current position program. Next, it is decided if n=0 or not (step S111). If the decision is YES, the program ends because erasing prevention cannot be reset for a program at a current tape position. On the contrary, if it is decided that n≠0 (NO at step S111), a flag EPn is reset as "1" and the resetting is informed to the resetter 39 for detecting a program erasing prevention flag (step S112). The step S112 corresponds to the means 39 for resetting a program erasing prevention flag. Next, flags EPm are examined for all m. First, the variable "m" is set as "0" (step S113). Next, it is decided if a flag EPm=0 (step S114). If the flag EPm is not "0" and if "m" is not equal to 170 (NO at step S115), "m" is increased by one (step S116). Next, the flow returns to step S114 to examine a next EPm. These steps S113–S116 correspond to the detector 37 for detecting a program erasing prevention flag. If EPm is decided to be "0" (YES at step S114), a flag EP0 is set as "0" (step S118) because a program erasing prevention flag EPm is set for at least one program ($\exists$EPn=0 for $0<n\leq170$). This step corresponds to the setter 40 for setting a tape erasing prevention flag. Then, the flow ends. On the other hand, if all flags EPm are found to be reset ($\forall$EPn=0 for $0<n\leq170$), the flag EP0 is reset as "1" (step S117) because all recorded programs can be erased. This step corresponds to the resetter 41 for resetting a tape erasing prevention flag. Then, the flow ends.

When a request of recording is received, a flow shown in FIG. 13 starts. When such a request is received, a program at a current tape position or the variable "n" is first detected (step S120), as will be explained in detail in FIG. 14. This step corresponds to the detector 36 for detecting a current position program. Next, it is decided if n=0 or not (step S121). If the decision is YES, the flow proceeds to step S123 to instruct recording operation to the recording control circuit 32. If "n" is not 0, it is decided next if a flag EPn=1 or not (step S122). If EPn=1, the flow also proceeds to step S123 for recording. In the two cases, a current tape position is located in a program in which erasing is allowed. On the other hand, if a flag EPn is set (NO at step S122), the recording control circuit 32 is instructed to stop recording (step S124) and the display unit 47 is instructed to display a message that recording is not allowed because a current tape position is located in a program in which erasing is inhibited (step S125), and the flow ends. After recording is effected, the flow returns to step S120 to repeat the processing of steps S120–S123 in order to prevent recording on a program in which erasing is inhibited if n changes. The recording operation continues until a stop operation is performed at step S124 or a stop instruction is received from the buttons 44.

In the flows explained above, program erasing prevention flags on all programs are set appropriately and the setting thereof is reflected on the setting of a tape erasing prevention flag. In a modified example, at step S124, the display unit 47 is instructed to display a warning message that a current tape position is located in a program in which erasing is inhibited and an instruction is asked to a user to be input with the buttons. Then, if recording is instructed again, the start of recording is instructed to the recording control circuit 32, while if stop is instructed, the stop of the recording operation is instructed to the recording control circuit 32.

Figure 14:
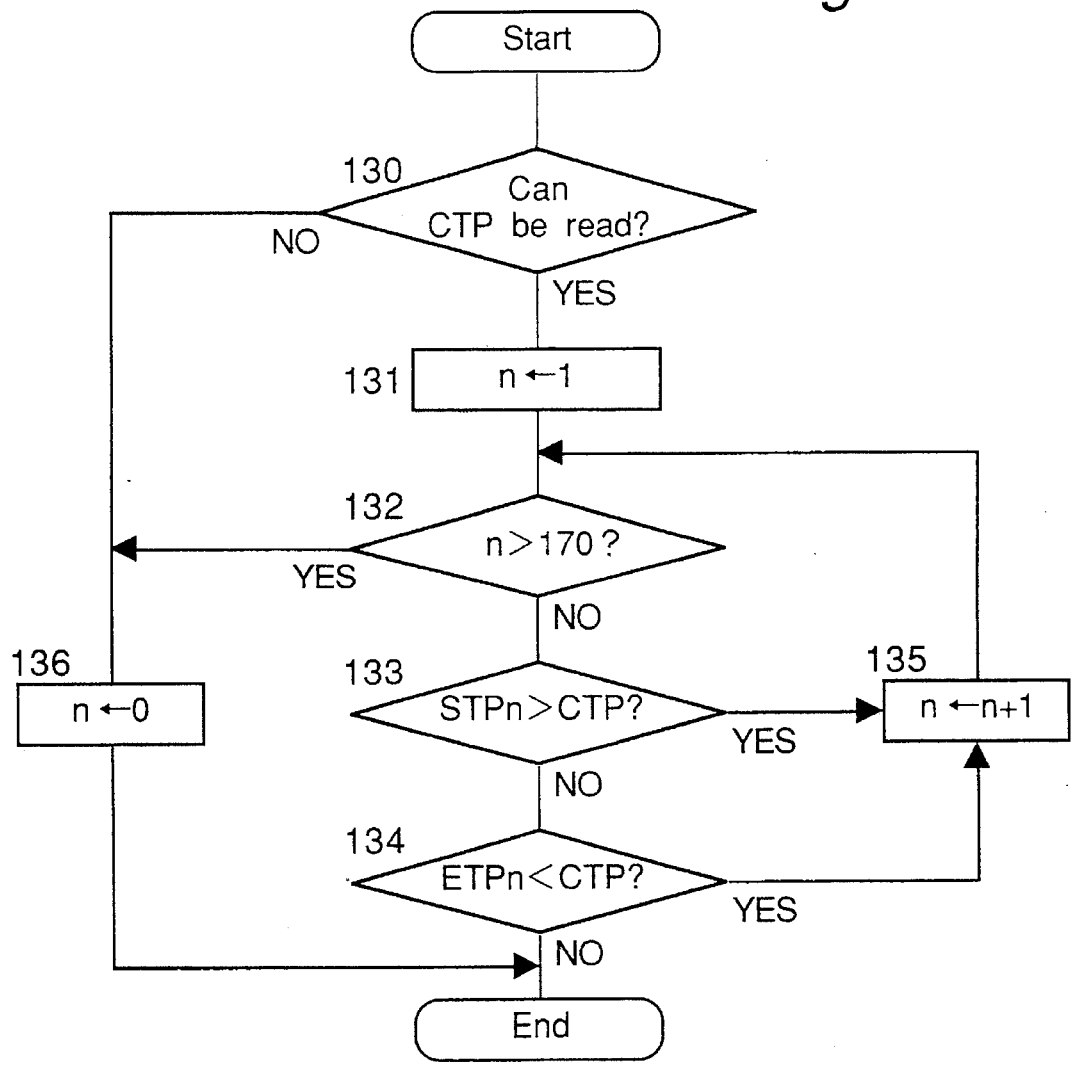
FIG. 14 is a flowchart of detecting a current tape position program.

FIG. 14 shows a flow of detecting a program at a current tape position (steps S100, S110 and S120). In the flow, STPn denotes a start tape position of an n-th program recorded in the program information area 15, at which the n-th program is started to be recorded, and ETPn denotes an end tape position of the n-th program at which the n-th program is completed to be recorded. An n-th program is recorded between STPn and ETPn, and if CTP exists between STPn and ETPn, it is found that CTP is located in the n-th program.

A current tape position (CTP) may not be read in an area in a video tape 4 wherein no video and audio signals are recorded at all. Then, it is decided first if a current tape position can be read (step S130). If a current tape position cannot be read (NO at step S130), "n" is set to "0" (step S136), and the flow ends. On the other hand, if it is decided that a current tape position can be read (YES at step S130), "n" is initialized at 1 (step S131). Then, it is decided if n is larger than 170 (step S132). If the decision is YES at this time, it is decided next if the current tape position is located between a start tape position STPn and an end tape position ETPn (steps S133 and S134). If the decision is YES (NO at both steps S133 and S134), the flow ends. Otherwise n is increased by one (step S135) and the flow returns to step S132 to check on the incremented n. If n which satisfies the relationship STPn$\leq$CTP$\leq$ETPn is not found until n>170 in the loop of step S132 to S135, the flow proceeds to step S136 to set n to 0.

Figure 15:
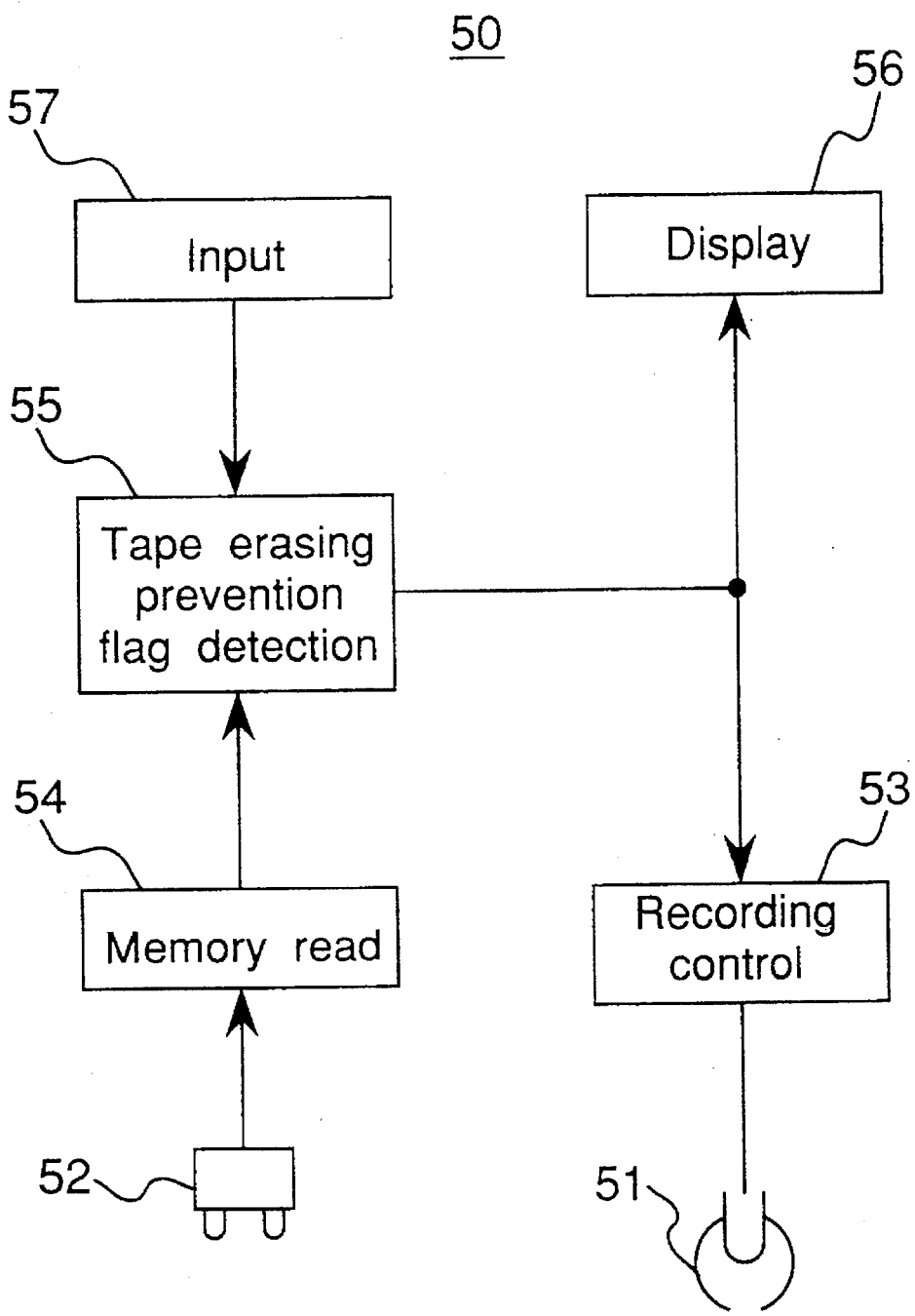
FIG. 15 is a block diagram of a main part of a limited function video cassette recorder of the first embodiment of the present invention.

Next, a limited function VCR is explained. The VCR has a structure similar to that shown in FIGS. 9 and 10. However, the function thereof is limited and circuits such as a memory write circuit is not included. FIG. 15 shows a main part of the VCR. The VCR includes a signal processing circuit for recording and reproducing video signals, a scan mechanism having a rotating drum and a fixed drum for scanning a tape 5 and a mechanism for loading and unloading a tape cassette 7, similarly to the full function VCR. It is compatible with the full function VCR explained above on the recording and reproduction of video and audio signals. The VCR comprises a recording head 51, a recording control circuit 53 and a display unit 56 similar to the counterparts in the full function VCR shown in FIG. 9. A memory read circuit 54 can read information stored in the tape information area 10 in the memory 5 in a tape cassette 7 and can send the read data to a microcomputer for controlling the VCR. The microcomputer includes a detector 55 for detecting a tape erasing prevention flag, and the detector 55 detects a tape erasing prevention flag if recording is instructed by buttons 57 operated by a user. If the flag shows that erasing is inhibited, the recording control circuit 53 is instructed to stop recording and to display a warning message for inhibiting recording in the display unit 56. The VCR cannot write and read data to and from the program information area in the memory.

Figure 16:
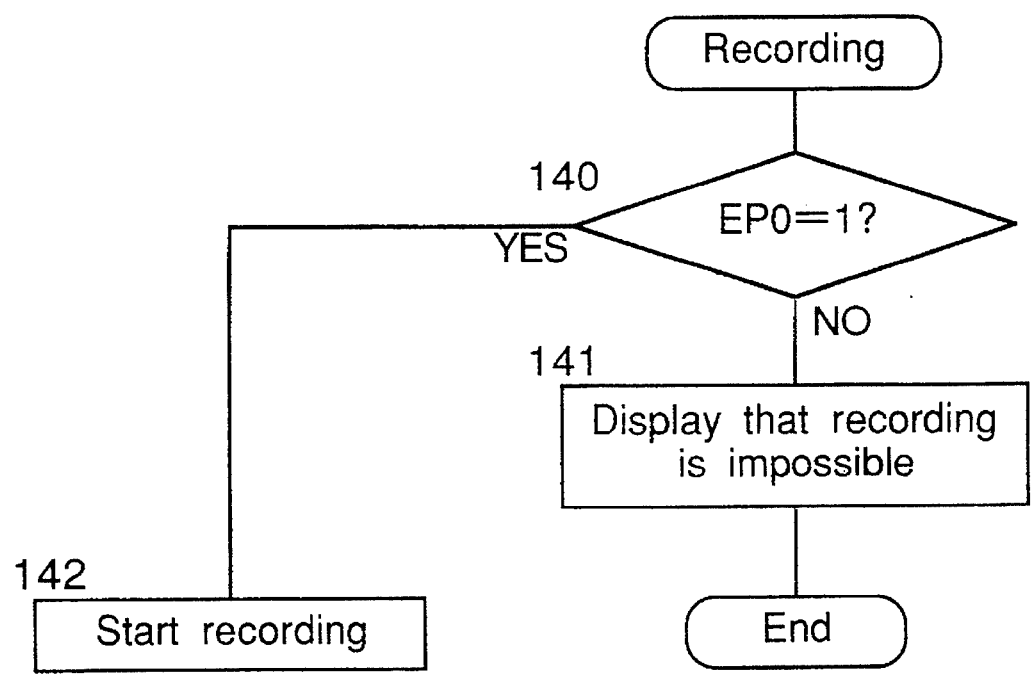
FIG. 16 is a flowchart of the video cassette recorder when recording is instructed by an input device.

FIG. 16 shows a flow of the microprocessor when recording is instructed by the buttons 57. First, it is detected if a tape erasing prevention flag EP0 is "1" (step S140). If the decision is YES, the recording control circuit 53 is instructed to start recording (step S142), and the flow ends. Otherwise, the recording control circuit 53 is instructed to stop recording and the display unit 56 is instructed to display a warning message that recording is impossible (step S141). Thus, a program on which a tape erasing prevention flag is set by the full function VCR is protected from being erased or overwritten by the limited function VCR.

In a modified example, similarly to step S124 in FIG. 13, at step S141, the display unit 56 is instructed to display a warning message that erasing is inhibited and an instruction is asked to a user to be input by the buttons. Then, if recording is instructed again by a user, the recording control circuit 53 is instructed to start recording, while if stop is instructed by a user, the recording control circuit 53 is instructed to stop. Then, even if erasing is inhibited on a tape cassette, recording is possible if necessary, for example if only a limited function VCR is available.

Next, a full function video VCR and a limited function VCR of a second embodiment of the present invention are explained. A tape cassette 7 having a memory 5 explained above can be used for the VCR, similarly to the above-mentioned first embodiment, but, the content recorded in the memory 5 is different from the counterpart in the tape cassette in the first embodiment.

Figure 17:
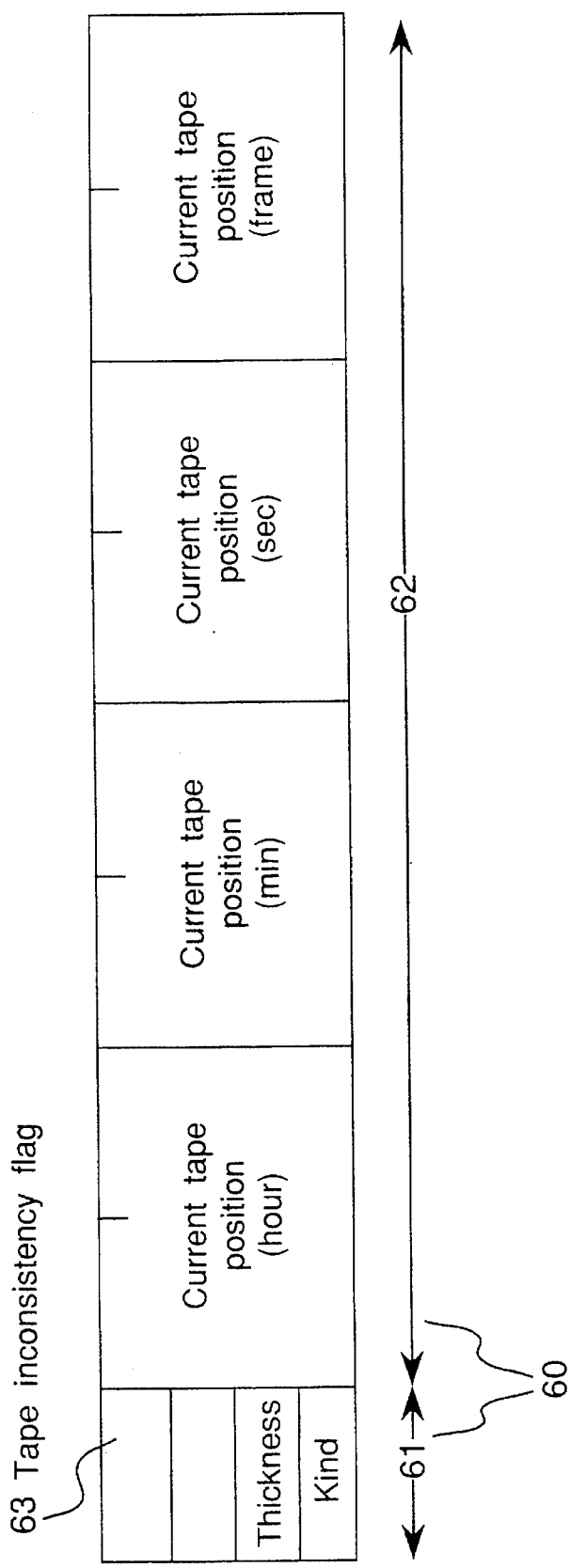
FIG. 17 is a memory map illustrating storage positions of data in a tape information area in a memory in accordance with a second embodiment of the present invention.
Figure 18:
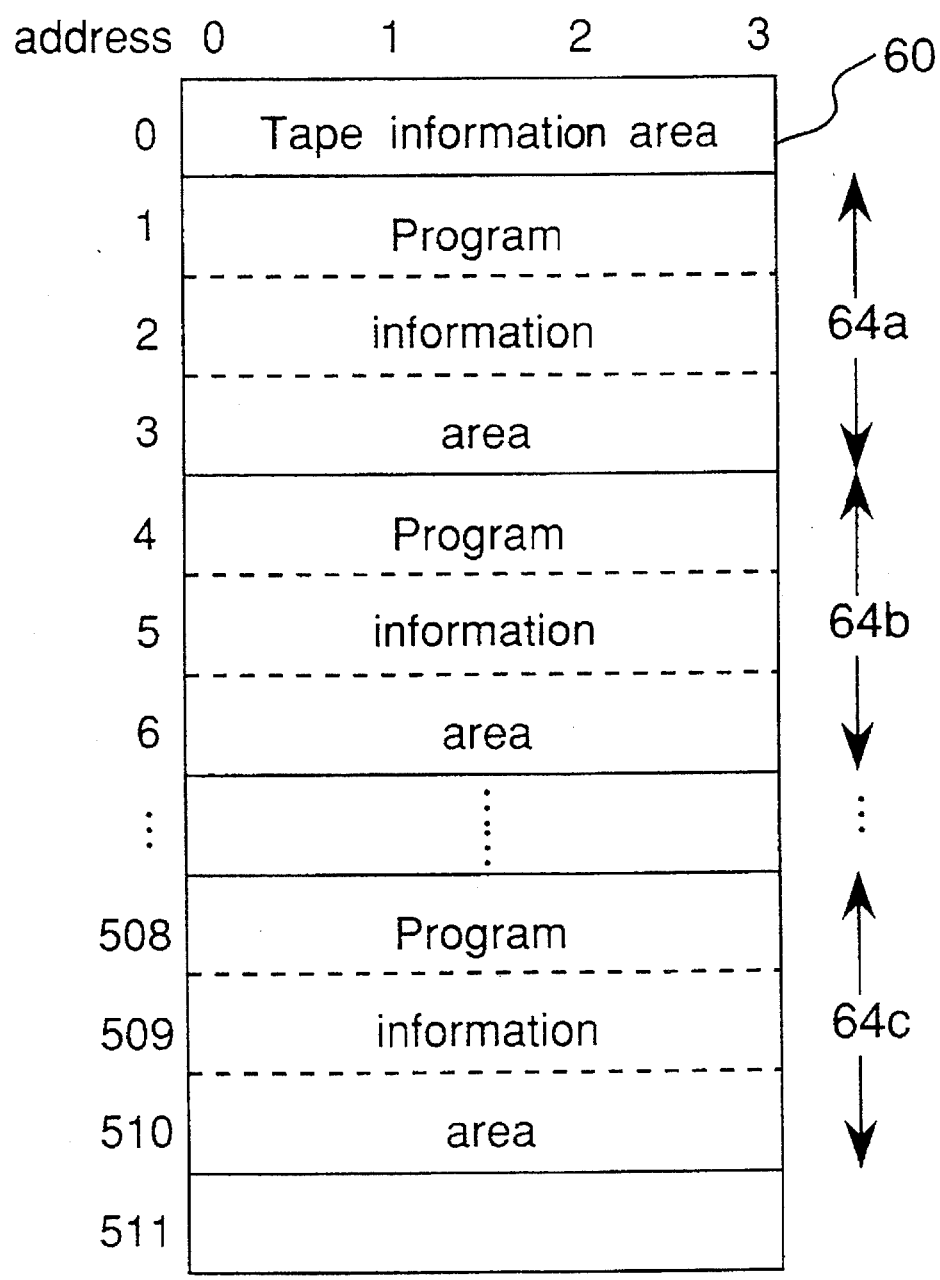
FIG. 18 is a memory map illustrating storage positions of data in a memory in the second embodiment.
Figure 19:
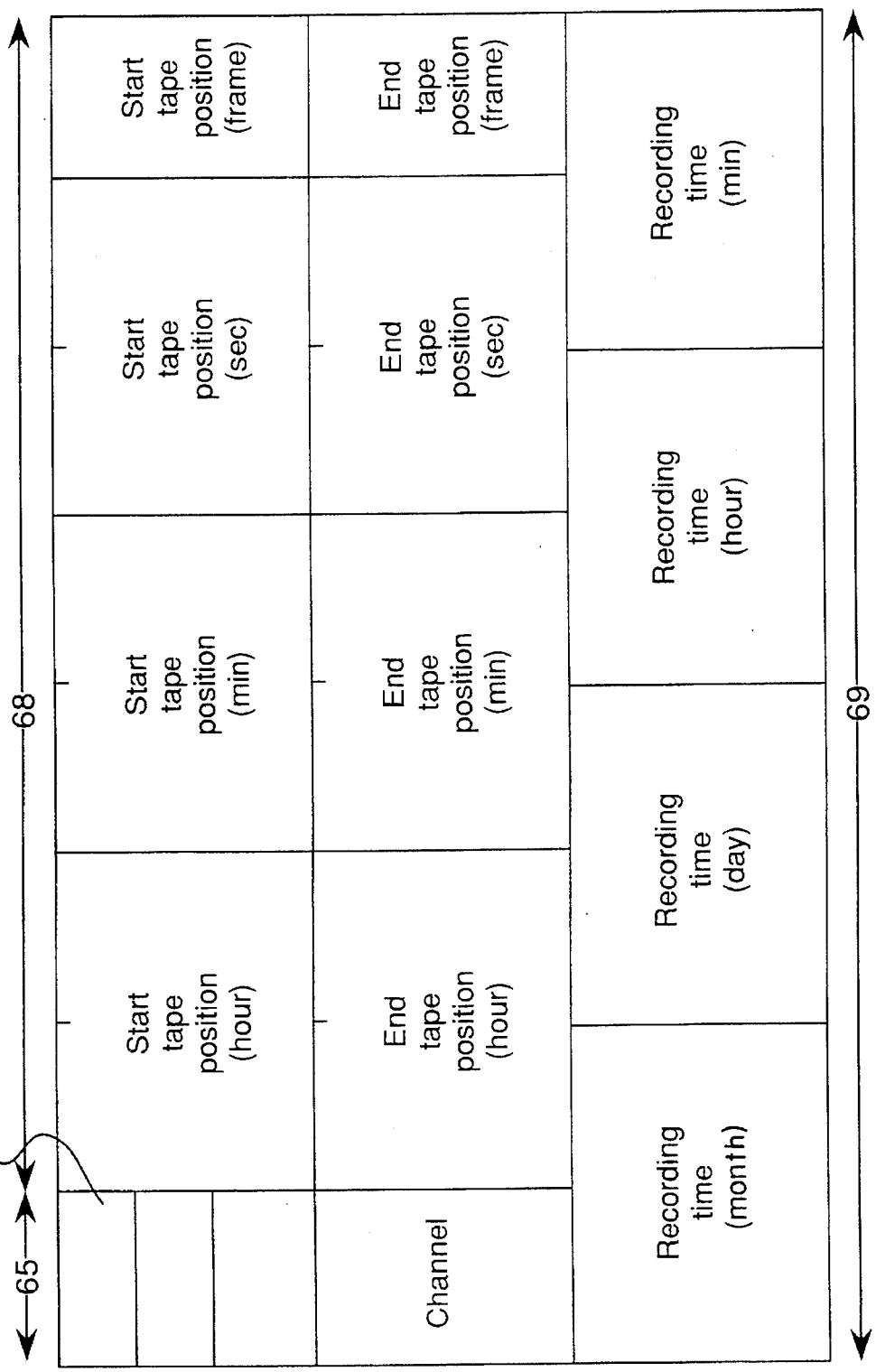
FIG. 19 is a memory map illustrating storage positions of data in a program information area in a memory in the second embodiment.

As shown in FIGS. 17–19, two warning flags, that is, a tape inconsistency flag stored in the tape information area and a program inconsistency flags stored in the program information area are used in the present invention. The tape inconsistency flag is set if programs recorded on an entire tape in a tape cassette do not coincide with information stored in the memory. On the other hand, the program inconsistency flag is provided for each program recorded on a tape, and a program inconsistency flag for a program is set if the program recorded on the tape does not coincide with information on the program stored in the memory.

The above-mentioned two kinds of flags can be used to check inconsistency between the programs actually recorded on a tape and the information on the programs in the memory device. A full function VCR can read and write both tape information area and program information area in the memory, while a limited function VCR can read and write only tape information area. If the tape cassette is used only by full function VCRs, no such inconsistency will occur.

However, if a video cassette with a memory is used to record a new program by a limited function VCR, the VCR cannot access the program information area in the memory. Therefore, the programs actually recorded on a tape do not coincide with the information on the programs in the memory, and a tape inconsistency flag is set to show the occurrence of the inconsistency. In other words, if a tape inconsistency flag is detected, it is decided that the tape has been recorded by a limited function VCR.

Further, the flags can be used for various processings to solve the inconsistency, as will be explained below. For example, data in the memory can be corrected according to the programs actually recorded on the tape. If a time data as well as video data is also recorded on a tape, overwrite can be detected, and data in the memory can be corrected according to the detected overwrite. If a cue signal or time data discontinuity is detected in a search of a program, data can be corrected according to the flags.

The memory 5 is for example a semiconductor memory having 2 kbytes of storage capacity. An address is expressed as an 11-bit data word; the abscissa denotes the lower two bits while the ordinate denotes the upper nine bits. FIGS. 17 and 18 show memory maps for illustrating storage positions of data in the memory device 5. As shown in FIG. 18, the tape information is stored in an area 60 at address "0" of the lower nine bits of the address, while the program information is stored in areas 64*a*, 64*b*, . . . , 64*c* at addresses "1"–"510" of the upper nine bits every three addresses.

As shown in FIG. 17, the tape information area 60 at address "0" for tape information is divided into an area 61 for recording information on the tape cassette 7 itself and an area 62 for recording information on a current tape position. The area 61 stores an attribute of video tape 4, recording conditions such as a model of VCR and the like, or in detail, it stores tape inconsistency flag 63, tape thickness, kind of tape and the like. In the area 62, a current tape position is recorded as to hour, minute, second and frame number when a tape cassette 7 is recorded or played back in a VCR and unloaded therefrom.

As shown in FIG. 18, the area for storing program information consists of areas 64*a*, 64*b*, . . . , 64*c* each for recording information on a program when the program is recorded with a full-function VCR. As shown in detail in FIG. 19, a first area 65 in one of the areas 64*a*, 64*b*, . . . , 64*c* stores a program inconsistency flag 66, recording prevention information, a logic erasing flag for recognizing that a program remains in the memory device but has been actually erased, channel information and the like. In an area 68 in succession to the area 65, a start tape position and an end tape position of programs recorded in the area 64*a*, 64*b*, . . . , 64*c* in the units of hour, minute, second and frame number. Further, in an area 69, a recording time on the programs registered in the area 64 is stored in the units of months, days, hours and minutes.

Figure 20:
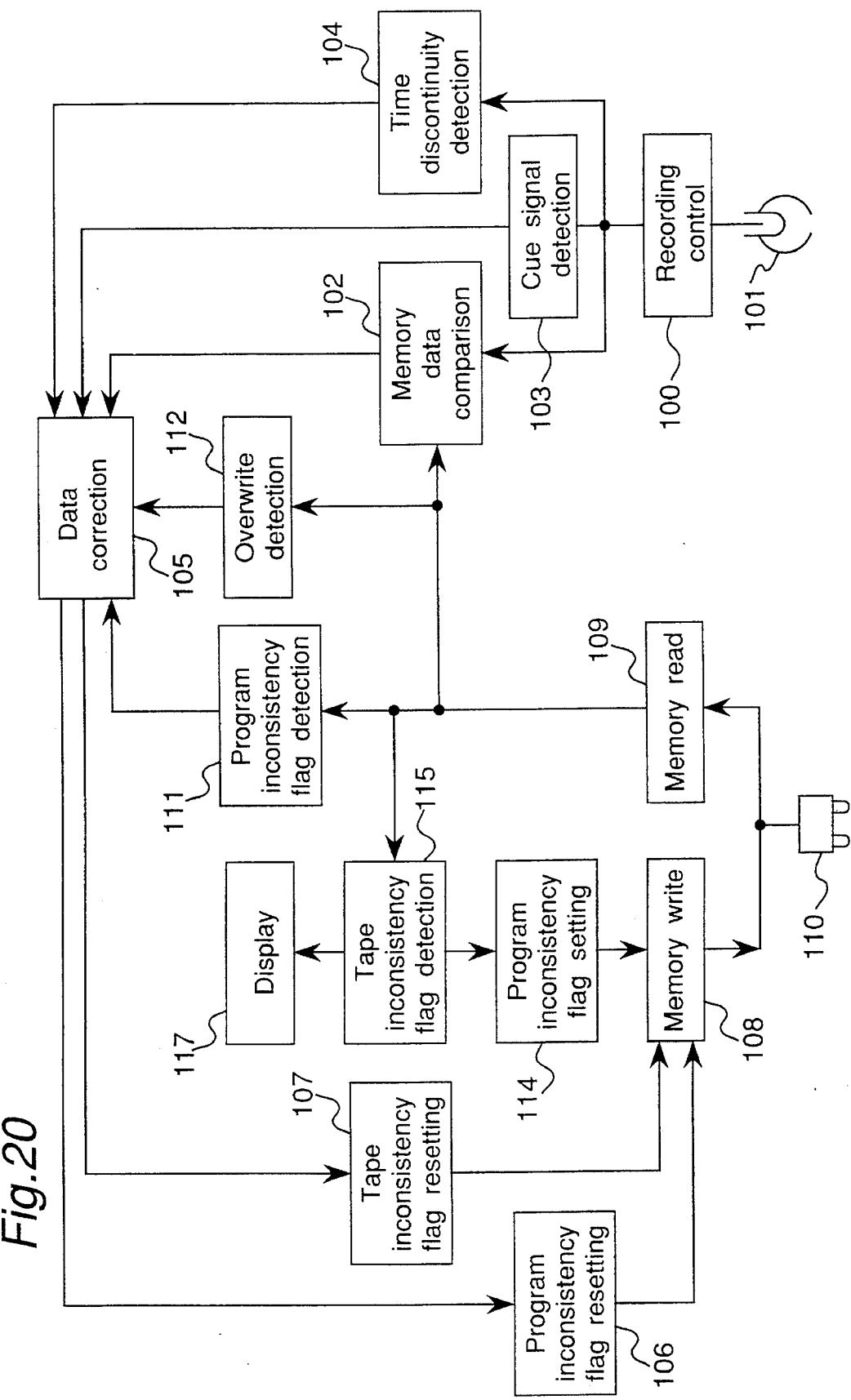
FIG. 20 is a block diagram of a main part of a full function video cassette recorder of the second embodiment.

A full function video cassette recorder (VCR) of the second embodiment shown in FIG. 20 has a structure similar to that shown in FIG. 10. The tape cassette 7 can be set in the VCR. The VCR includes a scan mechanism having a rotating drum and a fixed drum for scanning a tape 4 and a mechanism for loading and unloading a tape cassette. The control by a microprocessor (not shown) explained below with flowcharts is different from that of the full function VCR of the first embodiment. A recording head 101 is provided at the rotating head. Signals read by the head 101 are sent to a recording control circuit 100 (similar to the counterpart 32 in FIG. 9) and further to a comparator 102 for comparing them with the content of memory data. Further, when a tape is scanned for search at a fast speed, read signals from the head 101 are also sent to a cue signal detector 103 for detecting a cue signal and a time discontinuity detector 104 for detecting discontinuity of time data. The cue signal detector 103 detects for example a cue control signal such as VISS or VASS (hereinafter referred to as cue signal) when a video tape 4 is searched at a fast speed. The circuit time discontinuity detector 104 reads time data recorded in a video tape 4 to detect discontinuity of time data which may exist at a joint portion between regions of different programs. The comparator 102 compares information recorded in the memory 5 with the content recorded actually on a video tape 4. Output signals of elements 102–104 are sent to a data corrector 105 for correcting data. The data corrector 105 generates corrected data when the information in the tape information area 60 or in the program information area 64 in the memory 5 is rewritten. A program inconsistency flag resetter 106 resets a program inconsistency flag 66 in the memory 5 according to an instruction from the data corrector 105. A tape inconsistency flag resetter 107 resets a tape inconsistency flag 63 from "1" to "0" according to an instruction from the program inconsistency flag resetter 107 or from the data corrector 105.

A connector 110 is provided to access the memory 5 in a tape cassette 7 when it is set in the VCR, and the memory 5 is accessed by a memory write circuit 108 and a memory read circuit 109 for writing and reading information to and from the memory 5. A part of the data read by the memory read circuit 109 is sent to a tape inconsistency flag detector 115 for detecting a tape inconsistency flag, to an overwrite detector 112 for detecting overwrite and to a program inconsistency flag detector 111 for detecting a program inconsistency flag.

The program inconsistency flag detector 111 detects for a program if a program inconsistency flag 66 is "1" or "0" or if the information on the program agrees with the program actually recorded on the tape, and if the flag 66 is a "1", the detection result is sent to the data corrector 105. The overwrite detector 112 detects if a program to be newly recorded is overwritten on a program recorded previously, and the detection result is sent to the data corrector 105. If overwrite or recording is performed, the data corrector 105 always corrects data. The tape inconsistency flag detection means 115 decides for each program if the tape information recorded in the memory 5 is a "1" or a "0". If the inconsistency between the contents of the memory device and the tape is detected, the result is sent to the display unit 117 for displaying a warning message. The program inconsistency flag setter 114 sets all the program inconsistency flags when it receives the detection result of inconsistency from the tape inconsistency flag detector 115. The program inconsistency flags 66 are recorded in the memory 5 by way of the memory write circuit 108. The tape inconsistency flag resetter 107 resets the tape inconsistency flag according to an instruction from the data corrector 105 or the program inconsistency flag setter 114.

Figure 21:
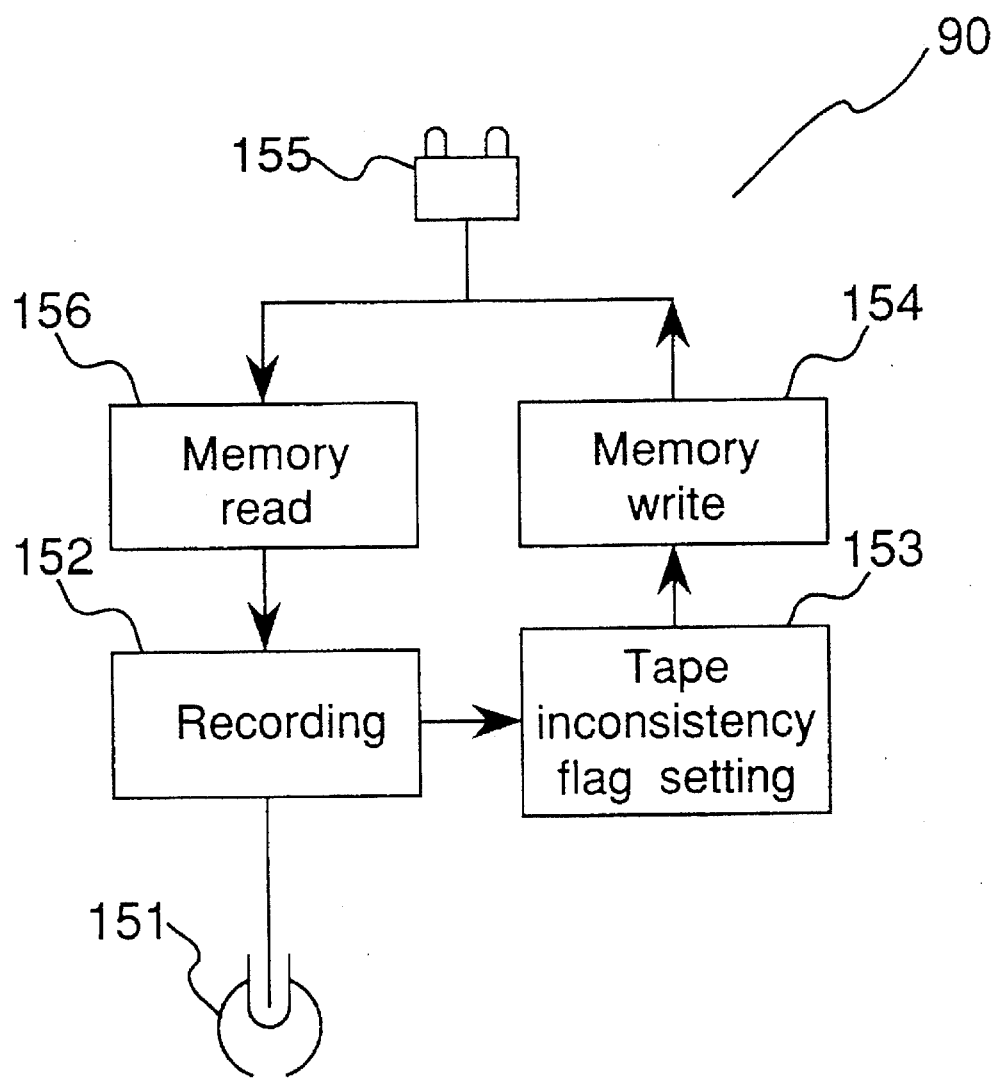
FIG. 21 is a block diagram of a main part of a limited function video cassette recorder of the second embodiment.

Next, a limited function VCR of the second embodiment is explained. FIG. 21 shows a main part of the VCR. The VCR includes a signal processing circuit for recording and reproducing video signals, a scan mechanism having a rotating drum and a fixed drum for scanning a tape 4 and a mechanism for loading and unloading a tape cassette 7, similarly to a prior art VCR. It is compatible with the full function VCR explained above on the recording and reproduction of video and audio signals. The VCR comprises a recording head 151, a recording control circuit 152, a tape inconsistency flag setter 153 and a memory write circuit 154 and a connector 155. The VCR can read and write data in the tape information area in a memory in a tape cassette, but it cannot read and write data in the program information area. In this point, the VCR has a limited function.

In a rotating head (not shown), the recording head 151 and a playback head (not shown) are mounted, and read signals for a video tape 4 is sent to a recording control circuit 152 connected to the recording head 151. The recording control circuit 152 also records video and audio signals on a tape cassette 7 with a memory 5 or a tape cassette of similar specifications. A portion of the signals is sent to the tape inconsistency flag setter 153 for setting the tape inconsistency flag. The setter 153 instructs the setting of a tape inconsistency flag by way of the memory write circuit 154 when a program is newly recorded on a new video cassette 7 or a video cassette 7 including recorded programs. The memory write circuit 154 writes the tape inconsistency flag in the memory 5 by sending a signal through the connector 155 to the memory 5 in the tape cassette. The memory read circuit 156 reads information recorded at a specified region at address "0" and a part of read information is given to the recording control circuit 152.

Figure 22:
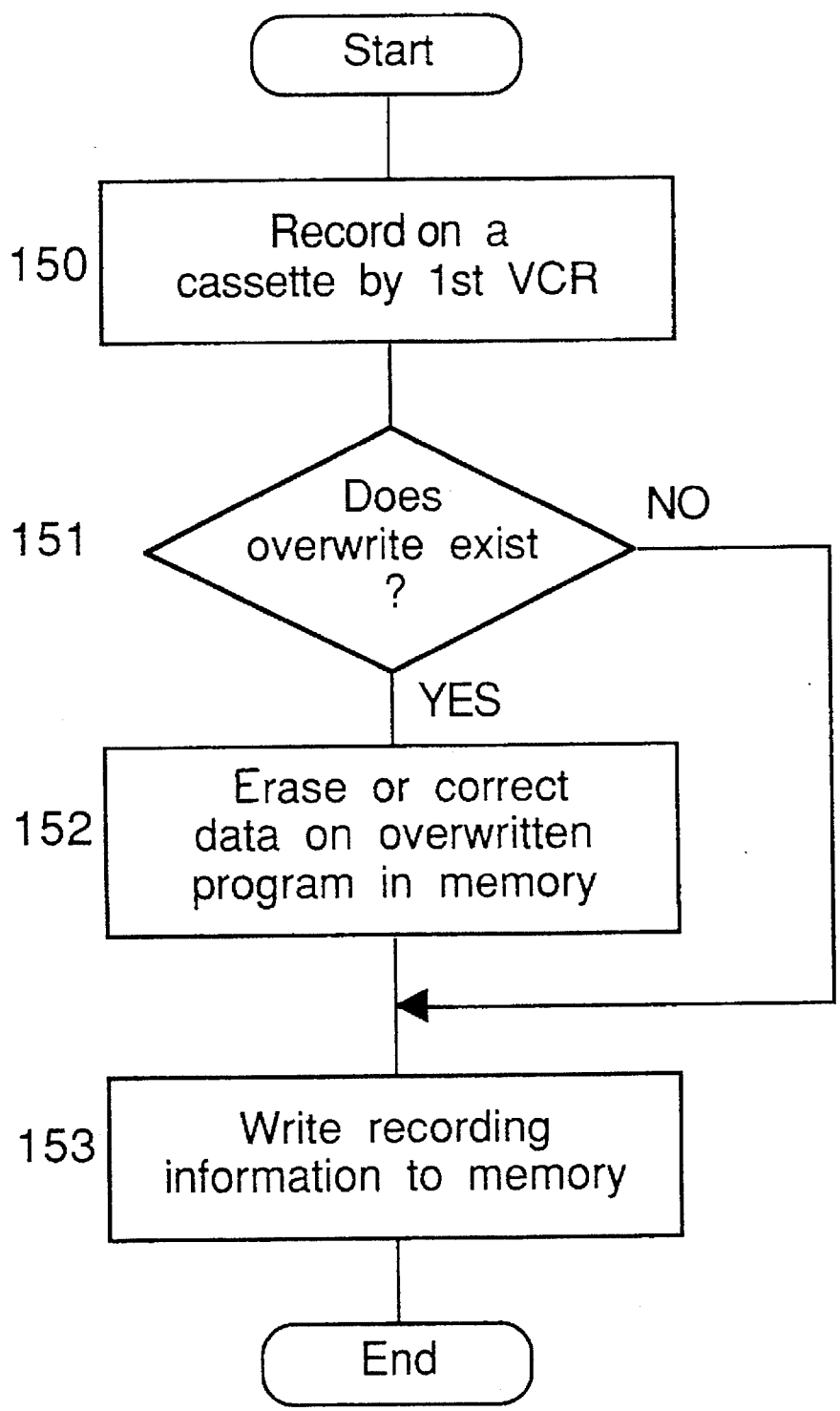
FIG. 22 is a flowchart when a tape cassette with a memory is recorded normally by the full function video cassette recorder.

Next, the recording and reproduction by the full function VCR and the limited function VCR are explained by using a tape cassette with a memory. Processings by the microprocessor according to instructions by a user operating the buttons are explained below, but a flow of branching according to an input has been omitted for simplicity. FIG. 22 shows a flow of recording a program in a tape cassette 7 by the full function VCR (1st VCR) when a user instructs recording. When an instruction for recording by a user is received, this flow starts, and a program is recorded on a video tape 4 in a tape cassette 7 (step S150). Next, information in the tape information area 60 and that in the program information area 64 in the memory 5 are detected and it is decided if overwrite exists or not (step S151). This step corresponds to the overwrite detector 112. If overwrite exists (YES at step S151), program information recorded previously is erased or the content of the program information is corrected (step S152). This step corresponds to the data corrector 105. Then, the flow proceeds to step S153. If it is decided that overwrite does not exist at step S151, the flow proceeds to step S153 readily. Then, program information on the recorded program is written in the program information area 64 in the memory 5 by the memory write circuit 108 (step S153). That is, program information such as recording time, recording channel and tape position is recorded. Thus, by correcting data, the data in the memory can always coincide with the programs recorded on the tape.

Next, data correction with relation to the search of a top position of a program is explained. When a tape cassette 7 is set in the full function VCR, it is possible to detect a cue signal as a top position of a program which a user want to play back. However, when a tape cassette 7 is set in the limited function VCR, though a program can be recorded in a video tape, the program information in the memory 5 cannot be updated. Therefore, for a tape cassette on which a program is recorded with the limited function VCR, the program information stored in the memory 5 may not agree with the content of programs actually recorded on the video tape. In this case, if the program information is read by the limited function VCR, it is possible that the program information stored in the memory 5 does not agree with the content of programs actually recorded on the video tape. Then, when a user instructs to play back a program, if the program does not exist in the video tape, the program cannot be searched eventually.

Figure 23:
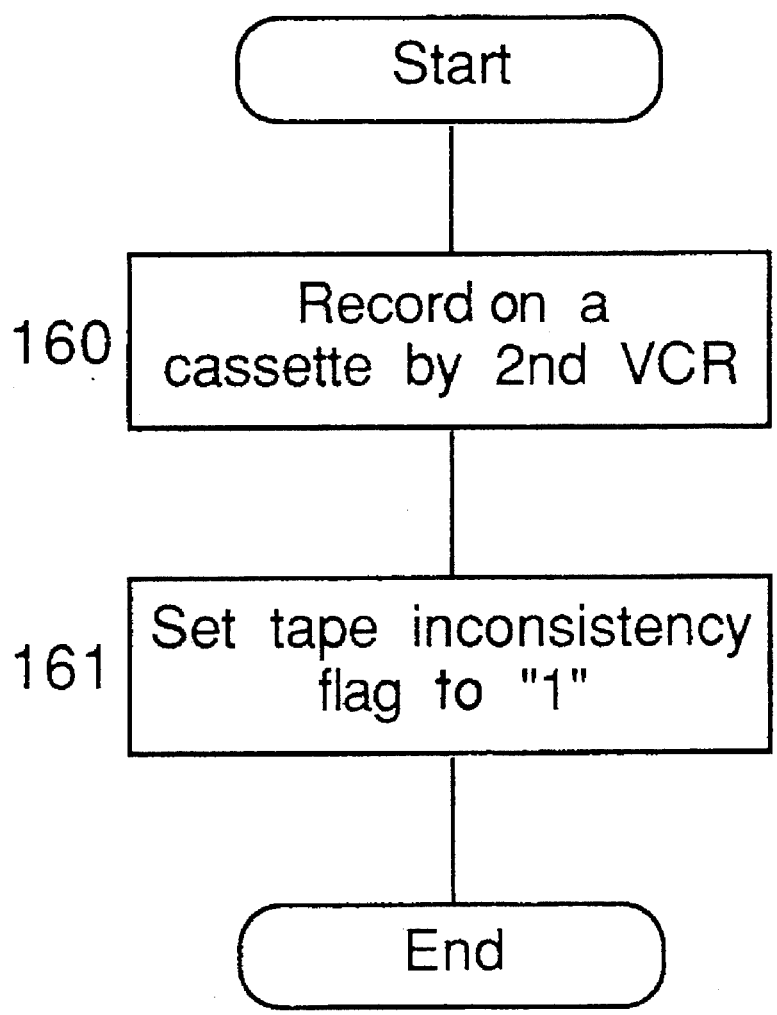
FIG. 23 is a flowchart of signal processing when programs are recorded by the limited function video cassette recorder.

Then, in the present embodiment, the limited function VCR sets a tape inconsistency flag when it records a program. That is, the tape inconsistency flag setter 153 of the limited function VCR sets the tape inconsistency flag, and the memory write circuit 154 sets the tape inconsistency flag 63 to "1" in the information area 61 when a program is recorded. FIG. 23 shows this flow. When a user of the limited function VCR instructs recording, a program is recorded in a tape cassette 7 (step S160). As explained above, the VCR can read and write only address 0 in the memory device 5. Then, when the VCR effects recording for the tape cassette 7, a "1" of the tape inconsistency flag is written to the address 0 by way of the memory write circuit 154. By using the tape inconsistency flag, tape inconsistency can be warned.

Next, it is explained how the full function VCR performs data correction when a tape inconsistency flag is set to "1" by a limited function VCR. The data correction is performed because the program information in the memory 5 may not agree with the content of the programs in the video tape 4. There are two methods for data correction. In the first method, a cue signal recorded at around a top of a program is detected in a video tape by the cue signal detector 103, and the cue signal is used for data correction. In the second method, a discontinuous point of time data is detected from the start of a video tape 4 by the time discontinuity detector 104, and data is corrected based on the detected discontinuous point.

Figure 24:
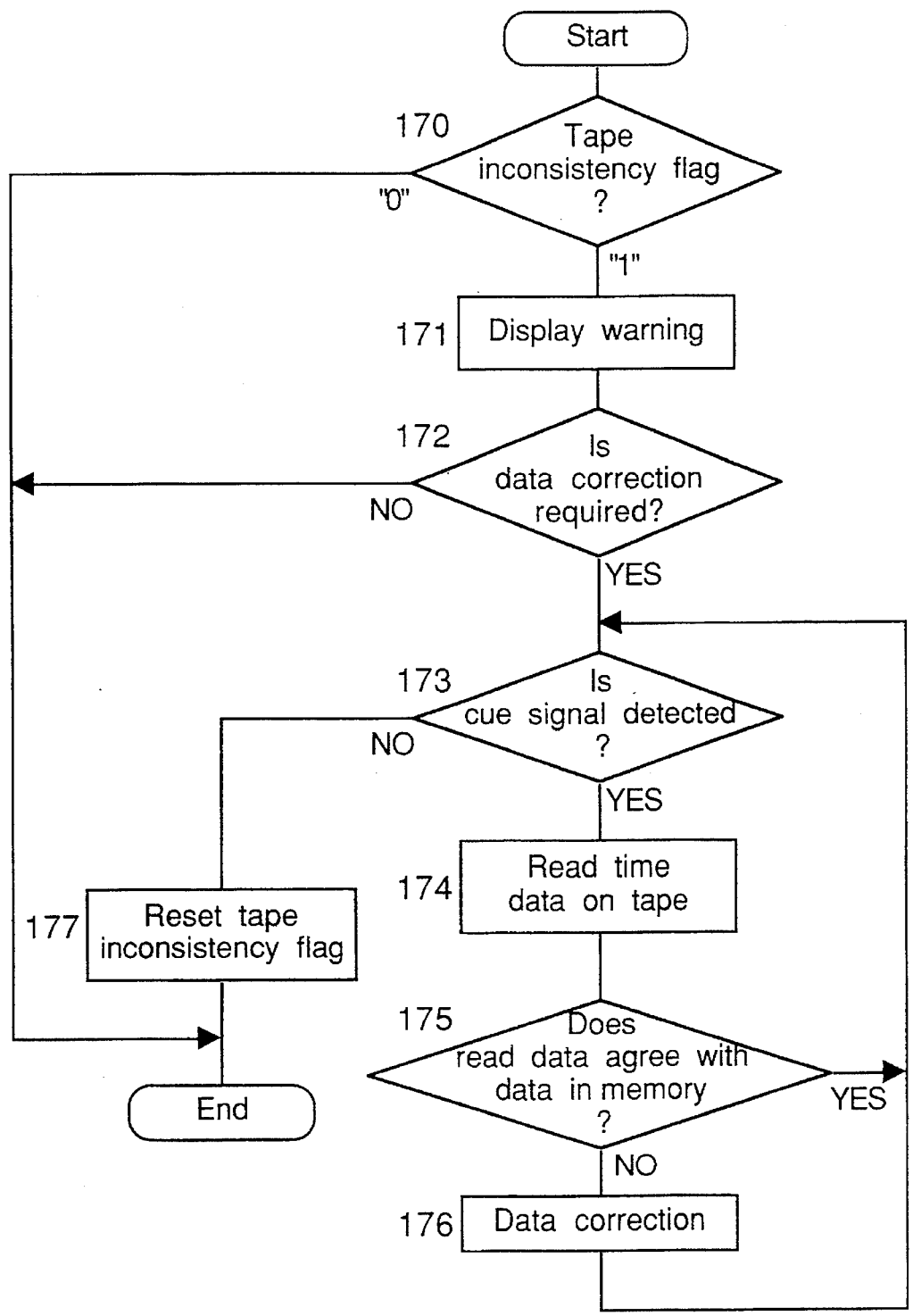
FIG. 24 is a flowchart of data correction performed by the first video cassette recorder by detecting cue signals when a tape cassette with a memory is recorded.

FIG. 24 shows a flow of the first method. When a user instructs recording a program by the full function VCR by an input device, a tape inconsistency flag at address 0 in the memory 5 is read first by the memory read circuit 109 and it is decided if the tape inconsistency flag is "1" or not (step S170). If the tape inconsistency flag is "0", the flow ends because no data correction is required, and an ordinary recording is carried out. On the other hand, if the tape inconsistency flag is "1" (NO at step S170), a warning is displayed in the display unit 117 because the program information in the memory 5 does not agree with the content of the programs recorded in the video tape 4 (step S171). Then, it is decided if data correction is requested by a user by an input device (step S172). If data correction is not required, the flow ends. Otherwise data correction is performed. First, a cue signal is detected (step S173). This step corresponds to cue signal detector 103. If a cue signal is detected (YES at step S173), a time data at a start tape position recorded on the video tape is read (step S174), and the time data in the tape is compared with the time data recorded in the memory 5 (step S175). If the disagreement between them is detected (NO at step S176), data in the memory is corrected according to the time data (step S176). This step corresponds to the data corrector 105. Then, the flow returns to step S173 in order to detect a next cue signal. If a cue signal is detected again at step S173, steps S174–S176 are repeated. If the detection of cue signals is completed at step S173, data correction is completed, and the flow branches to step S177 to reset the tape inconsistency flag 63 to "0". This step corresponds to the tape inconsistency flag resetter 106. Thus, data correction is carried out by detecting the cue signals recorded in a video tape 4.

Figure 25:
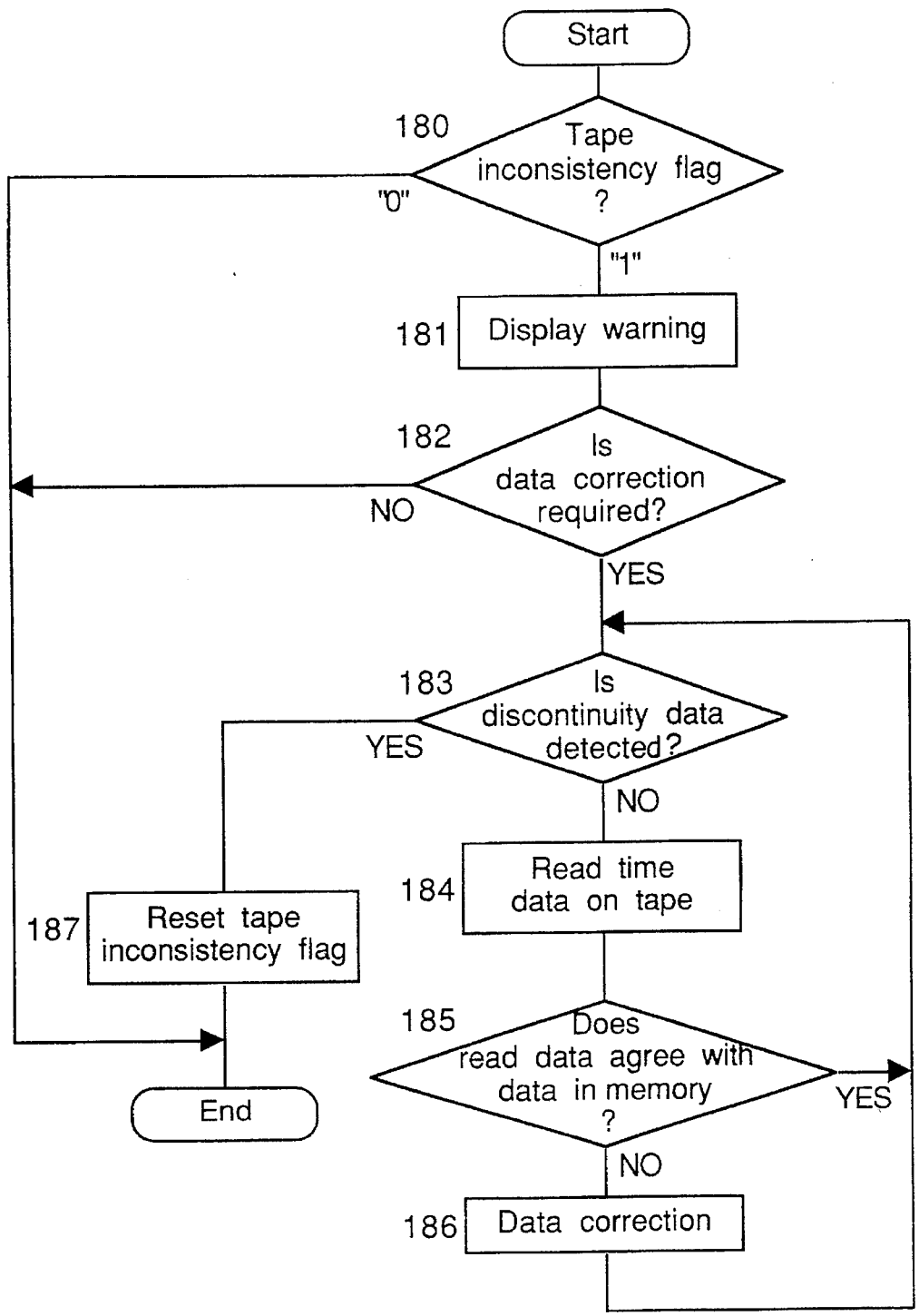
FIG. 25 is a flowchart of data correction performed by the first video cassette recorder by detecting discontinuity of time data when a tape cassette with a memory is recorded.

FIG. 25 shows a flow of the second method. When a user instructs recording a program by the full function VCR by an input device, a flow of steps S180–S187 is performed which is the same as that shown in FIG. 23 except step S183, and a detail explanation thereof has been omitted here. At step S183, a time data recorded on a video tape 4 is read and a discontinuity thereof is detected. This step corresponds to the time discontinuity detector 104. When a discontinuity is detected (YES at step S183), a time data at a point where the discontinuity is detected is read (step S184). Then, the time data is compared with the content on the memory 5 (step S185), and if disagreement between them is found, data in the memory device is corrected according to the time data (step S186). This step corresponds to the data corrector 105.

In the above-mentioned two examples of data correction, if it is warned by the tape inconsistency flag that the data in the memory does not agree with the recorded programs, data correction is performed by detecting cue signals or time discontinuity points. Therefore, data in the memory can be corrected according to the programs actually recorded on the tape. If a relevant information is not recorded in the memory 5, data in the memory is inconsistent with the program recorded on the tape, and an information to be recorded in the memory 5 is generated based on data in the video tape 4 for data correction. Thus, when a program is recorded by a full function VCR, the information on the program will coincide always with the recorded programs on the tape automatically. Then, the inconsistency has vanished, and the tape inconsistency flag is reset. Thus, a user can manage programs easily by using a tape cassette with a memory.

However, because the above-mentioned data correction is carried out for each program from the top to the end of a video tape 4, it is needed to stop the video tape at times of a number of recorded programs, and it takes about ten minutes. Therefore, it is desirable to omit data correction, for example, when a user wants to start recording at once.

Next, recording of a program without data correction is explained. It is assumed that the tape inconsistency flag 63 in the tape information area 60 in the memory 5 is set to "1". In this case, the program information in the memory 5 may not agree with the content of the programs in the video tape 4. However, recording is carried out by the full function VCR in the tape cassette 7 without data correction.

Figure 26:
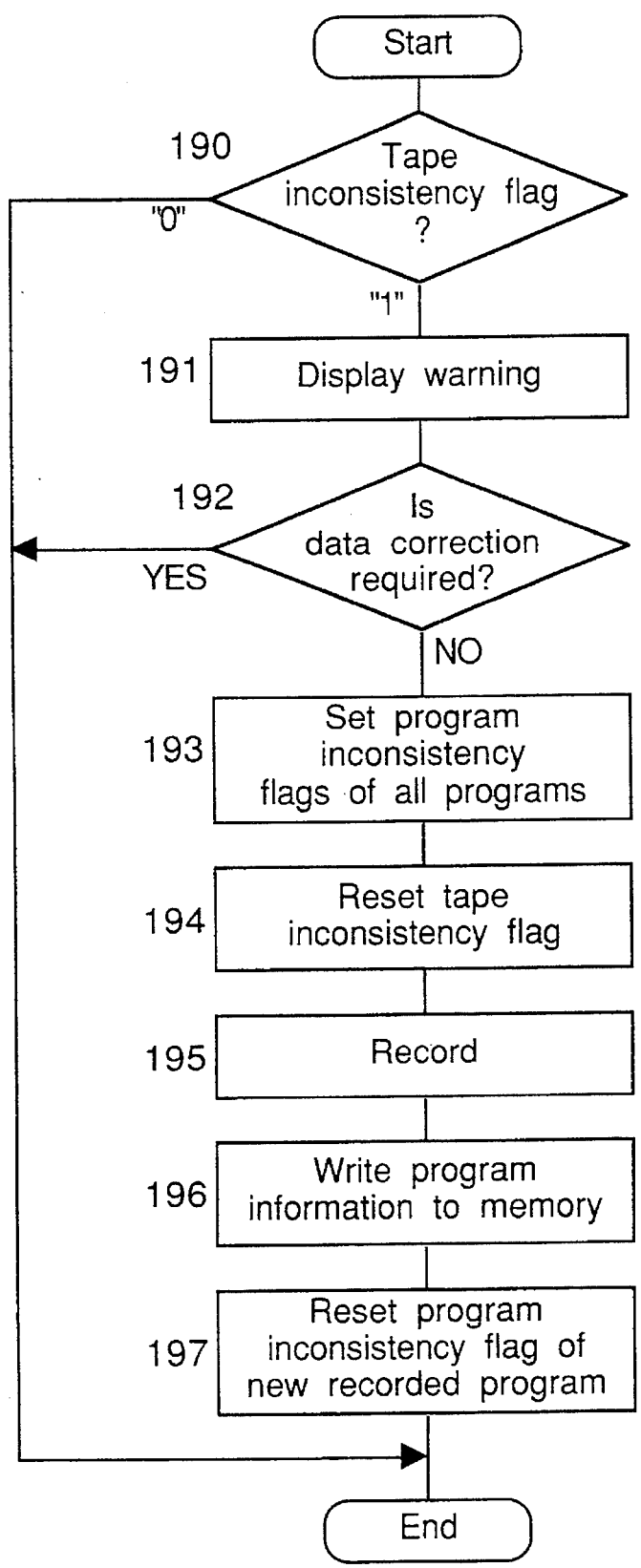
FIG. 26 is a flowchart of recording when a tape cassette with a memory is recorded by the first video cassette recorder without data correction.

FIG. 26 shows a flow of signal processing in this case. When a user instructs recording a program by the full function VCR by an input device, before starting recording, the tape inconsistency flag at address 0 in the memory 5 is read by the memory read circuit 109 and it is decided if the tape inconsistency flag is "1" or not (step S190). If the tape inconsistency flag is "0", the flow ends because no data correction is required, and an ordinary recording is carried out On the other hand, if the tape inconsistency flag is "1", a warning is displayed in the display unit 117 (step S191) and the VCR waits until the user gives an instruction. If data correction is requested (YES at step S192), this flow ends, and the data correction shown in FIG. 24 or 25 is performed. If data correction is not requested (NO at step S192), all program inconsistency flags 66 in the program information area 64 are set for all programs recorded already in the memory 5 (step S193). This step corresponds to the program inconsistency setter 114. Next, the tape inconsistency flag 63 in the tape information area 60 is reset to "0" (step S194). This step corresponds with the tape inconsistency flag resetter 107. Then, recording of a program which the user want to record is carried out (step S195). After the recording is completed, a program information on the program is written in o the memory 5 (step S196). Then, a program inconsistency flag 66 of the newly recorded program is reset to "0" (step S197). This step corresponds to the program inconsistency resetter 107.

When a program is newly recorded without data correction, the tape inconsistency flag is reset first. Then, a program inconsistency flag for the newly recorded program is reset, while the program inconsistency flag for the other recorded programs are set. Therefore, when the tape is reproduced, the reliability of program information can be confirmed for each program.

Thus, when a program information is read from the memory 5, a program inconsistency flag 66 is read from the program information area 64, and it can be decided if the program information agrees with the content of the programs recorded on a video tape 4. That is, in a video tape 4 wherein a plurality of programs are recorded, the program information in the memory 5 for a program on which a program inconsistency flag 66 is a "1" may not agree with the content of the programs. On the other hand, it is found that the program information in the memory 5 for a program on which a program inconsistency flag 66 is a "0" agrees with the content of the program recorded in the tape 4.

Figure 27:
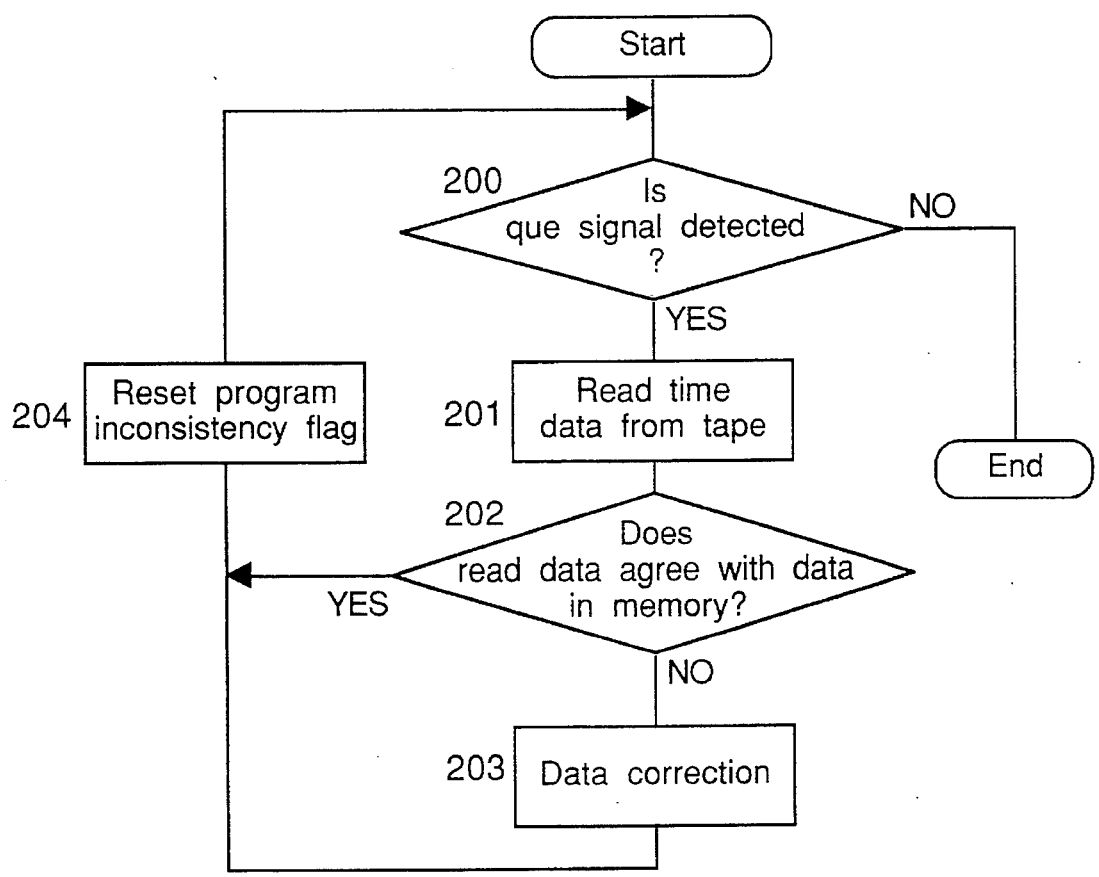
FIG. 27 is a flowchart of data correction performed by the first video cassette recorder after a tape cassette with a memory is recorded.

Next, data correction is explained in a case wherein the tape inconsistency flag is a "0" while program inconsistency flags are "0" or "1" mixedly. FIG. 27 shows signal processing in this case wherein data correction is performed by detecting cue signals. When a user instructs recording a program by the full function VCR by an input device, a cue signal is detected by searching a video tape 4 at a fast speed (step S200). This step corresponds to the cue signal detection circuit 73. If a cue signal is detected (YES at step S201), a time data is read from the video tape 4 (step S201). Next, the time data is compared with the time data recorded in the memory 5 (step S202). If the data do not agree, data correction is performed (step S203). Then, a program inconsistency flag 66 of the program on which data correction is performed is reset to "0". This step corresponds to the program inconsistency flag resetter 107. Next, the flow returns to step S200 in order to detect a next cue signal and the above-mentioned processings are repeated. The flow returns also to step S200 if the data agree at step S202 and the program inconsistency flag is reset at step S204. If a cue signal is not detected at step S200, the flow ends.

Therefore, when program information is corrected for a tape cassette wherein programs are already recorded, each program can be searched by using cue signals. After program information is corrected, the program inconsistency flags are reset. Then, when the tape is reproduced later, program information can be confirmed for each program.

There is a case wherein reproduction and data correction are not needed for an area wherein a program inconsistency flag 66 is set as "1" in the program information area 64 in the memory 5 and the flag 66 may not agree with the program on the video tape 4. For example, for a program which was already played back and has a program inconsistency flag 66 set to "1" in the program information area 64, the program information can be erased instead of data correction (step S203). Thus, a portion including the program can be handled as a non-recorded portion wherein a program does not exist. Therefore, there exist in the memory 5 only areas on which program information flags 66 are reset to "0" or programs on which the program information agrees with the content of the programs. Then, the program information agrees with the contents of the programs recorded on the video tape 4 without data correction.

Figure 28:
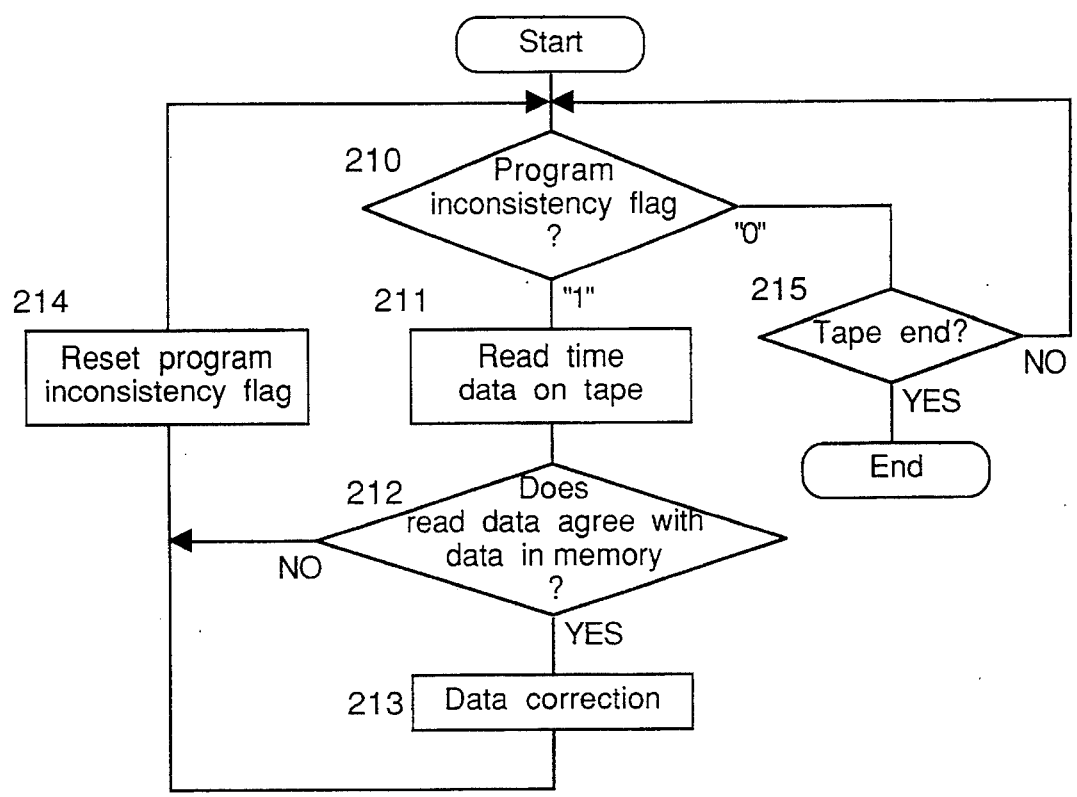
FIG. 28 is a flowchart of data correction performed simply by the first video cassette recorder after a tape cassette with a memory is recorded.

FIG. 28 shows a flow of this simplified data correction by the full function VCR. When a user instructs recording by the full function VCR, before searching the video tape 4 at a fast speed, a program on which a program inconsistency flag 66 is set to "1" is detected (step S210). This step corresponds with the program inconsistency flag detector 115. If such a program is detected, the video tape 4 is searched to a portion wherein the program is recorded, and a time data of the searched program is read (step S212). Then, the read time data is compared with the data recorded in the memory 5. If the data does not agree (step S212), data correction is performed (step S213). This step corresponds with the data corrector 105. Next, a program inconsistency flag 66 is reset to "0" (step S214). This step corresponds with the program inconsistency flag resetter 107. Then, the flow returns to step S210 to repeat the above-mentioned processings. If the data agree at step S212, the program inconsistency flag is reset at step S214 and the flow also returns to step S210 to repeat the above-mentioned processings. The detection of program inconsistency flag at step S210 is performed up to the end of the video tape 4, or the data correction ends at the end of the video tape 4.

Thus, when data correction is performed for a tape cassette wherein programs are already recorded, only programs on which program inconsistency flags are set are searched and the data thereon are corrected. Then, the data correction can be performed fast.

Because the limited function VCR does not have a means for driving program information in the memory, the programs recorded by the limited function VCR are not expected that data on the programs is recorded in the memory 5. Though programs recorded in a video tape do not necessarily agree to the program information stored in the memory 5, the information in the memory 5 always exists on the video tape 4. Therefore, the recorded information itself does not include an error though the information includes deficiencies. In this method, it is not needed to stop at every program in a search at a fast speed for a video tape, a time needed for data correction can be shortened.

As explained above, a program inconsistency flag is provided for each program recorded in the memory 5. Therefore, even if programs are recorded by a limited function VCR not having a means for driving program information in the memory 5, it can be decided if the program information stored for each program agrees with the content of programs recorded on a video tape, and the efficiency of data correction can be improved further.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A recording apparatus which uses a tape cassette with a memory and records a program and time data on a tape contained within the tape cassette, the memory having a program information area for storing program information on programs recorded on the tape in the tape cassette and a tape information area for storing tape information on the tape, and the program information area including an area for storing a program inconsistency flag which is reset or set for each of the programs recorded on the tape in accordance with whether or not a content of a recorded program coincides with the information on the recorded program on the tape, and the tape information area including an area for storing a tape inconsistency flag which is set or reset in accordance with whether or not the content actually recorded on the entire tape is inconsistent with the program information stored in the memory, said recording apparatus comprising:

a memory writer for writing tape information and program information into the memory provided in the tape cassette;

a memory reader for reading tape information and program information from the memory;

a first detector for detecting the tape inconsistency flag stored in said memory and read by said memory reader;

a second detector for detecting the program inconsistency flag stored in said memory and read by said memory reader;

a setter for setting the program inconsistency flag in the program information area for each recorded program using said memory writer when said first detector has detected that the tape inconsistency flag has been set; and a resetter for resetting the tape inconsistency flag in the tape information area using said memory writer when said second detector has detected that the program inconsistency flag in the program information area has been set after said setter has set the program inconsistency flag in the program information area.

2. The apparatus according to claim 1, further comprising:

a tape reader for reading time data on the tape in the tape cassette;

an overwrite detector for receiving the program information from the program information area from said memory reader and for detecting, according to time data on the tape read by said tape reader, if a program described in the program information has been recorded at a recording position in correspondence with the program information, and for deciding than an overwrite has occurred if it has been determined that the program has not been recorded at the recording position;

a data corrector for correcting the program information in the program information area, as actually recorded on the tape, for a program on which overwrite has occurred as detected by said overwrite detector, as actually having been recorded on the tape, according to time data on programs already recorded or a current program to be recorded on the tape; and a resetter for resetting the program inconsistency flag for each recorded program after said data corrector has corrected the program information in the program information area.

3. The apparatus according to claim 2, wherein said tape reader also reads a cue control signal on the tape in the tape cassette, and wherein said apparatus further comprises a detector for detecting a cue control signal, read by said tape reader, and recorded at a top of each recorded program.

4. The apparatus according to claim 2, further comprising a detector for detecting a discontinuity of the time data read by said tape reader.

5. A recording apparatus which uses a tape cassette with a memory and records a program and time data on a tape contained within the tape cassette, the memory having a program information area for storing program information on programs recorded on the tape in the tape cassette and a tape information area for storing tape information on the entire tape in the tape cassette, and the program information including a program inconsistency flag which is reset or set for each of the programs recorded on the tape in accordance with whether or not a content of a recorded program is inconsistent with the information on the recorded program on the tape, and the tape information including a tape inconsistency flag which is set or reset in accordance with whether or not the content actually recorded on the entire tape is inconsistent with the program information in the memory, said apparatus comprising:

a memory writer for writing tape information and program information into the memory provided in the tape cassette;

a memory reader for reading tape information and program information from the memory provided in the tape cassette;

a tape reader for reading time data on the tape in the tape cassette;

an overwrite detector for receiving the program information from the program information area from said memory reader and for detecting, according to time data on the tape read by said tape reader, if a program described in the program information has been recorded at a recording position in correspondence with the program information, and for deciding that an overwrite has occurred if it has been determined that the program has not been recorded at the recording position; and a data corrector for correcting the program information in the program information area, as actually recorded on the tape, for a program on which overwrite has occurred, according to time data on a current program to be recorded on the tape.

6. A recording apparatus which uses a tape cassette with a memory and records a program and time data on a tape contained within the tape cassette, the memory having a program information area for storing program information on programs recorded on the tape in the tape cassette and a tape information area for storing tape information on the entire tape in the tape cassette, and the program information including a program inconsistency flag which is set or reset for each of the programs recorded on the tape in accordance with whether or not a content of a recorded program is inconsistent with the information on the recorded program in the tape, and the tape information including a tape inconsistency flag which is set or reset in accordance with whether or not the content actually recorded on the entire tape is inconsistent with the program information in the memory, said apparatus comprising:

a memory writer for writing tape information and program information into the memory in the tape cassette;

a memory reader for reading tape information and program information from the memory in the tape cassette;

a tape reader for reading time data and a cue control signal on the tape in the tape cassette;

a detector for detecting the tape inconsistency flag read by said memory reader;

a detector for detecting the cue control signal recorded at a top of each recorded program read by said tape reader when said detector has detected that the tape inconsistency flag has been set;

a data corrector for correcting the program information in the program information area, as actually recorded on the tape, for a program on which the cue signal has been detected by said detector, according to time data on programs already recorded on the tape; and a resetter for resetting the tape inconsistency flag after said data corrector has corrected the program information in the program information area.

7. A recording apparatus which uses a tape cassette with a memory and records a program and time data on a tape contained within the tape cassette, the memory having a program information area for storing program information on programs recorded on the tape in the tape cassette and a tape information area for storing tape information on the entire tape in the tape cassette, and the program information including a program inconsistency flag which is set or reset for each of the programs recorded on the tape in accordance with whether or not a content of a recorded program is inconsistent with the information on the recorded program on the tape, and the tape information including a tape inconsistency flag which is set or reset according when the content actually recorded on the entire tape is inconsistent with the program information in the memory, said apparatus comprising:

a memory writer for writing tape information and program information into the memory in the tape cassette;

a memory reader for reading tape information and program information from the memory in the tape cassette;

a tape reader for reading time data on the tape in the tape cassette;

a detector for receiving time data recorded for each program on the tape read by said tape reader and for detecting a discontinuity of the time data;

a data corrector for correcting the program information in the program information area, as actually recorded in the tape, for programs on which a discontinuity of the time data has been detected by said detector, according to time data on programs already recorded on the tape; and a resetter for resetting the tape inconsistency flag after said data corrector has corrected the program information in the program information area.

8. A recording apparatus which uses a tape cassette with a memory and records a program and time data on a tape contained within the tape cassette, said memory having a program information area for storing program information on programs recorded on the tape in the tape cassette and a tape information area for storing tape information on the entire tape in the tape cassette, the program information including a program inconsistency flag which is set or reset for each of the programs recorded on the tape in accordance with whether or not a content of a recorded program is inconsistent with the information on the recorded program in the tape, and the tape information including a tape inconsistency flag which is set or reset in accordance with whether or not the content actually recorded on the entire tape is inconsistent with the program information in the memory, said apparatus comprising:

- a memory writer for writing tape information and program information into the memory in the tape cassette;
- a memory reader for reading tape information and program information from the memory in the tape cassette;
- a tape reader for reading time data and a cue control signal on the tape in the tape cassette;
- a detector for detecting the tape inconsistency flag in the tape information area read by said memory reader;
- a detector for detecting the cue control signal recorded at a top of each recorded program read by said tape reader when said detector has detected that the tape inconsistency flag has been set;
- a data corrector for correcting the program information in the program information area, as actually recorded on the tape, for programs on which the cue control signal has been detected by said detector, according to time data on programs already recorded on the tape; and
- a resetter for resetting the program inconsistency flag after said data corrector has corrected the program information in the program information area.

9. A recording apparatus which uses a tape cassette with a memory and records a program and time data on a tape contained within in the tape cassette, the memory having a program information area for storing program information on programs recorded on the tape in the tape cassette and a tape information area for storing tape information on the entire tape in the tape cassette, and the program information including a program inconsistency flag which is set or reset for each of the programs recorded on the tape in accordance with whether or not a content of a recorded program is inconsistent with the information on the recorded program in the tape, and the tape information including a tape inconsistency flag which is set or reset in accordance with whether or not the content actually recorded on the entire tape is inconsistent with the program information in the memory, said apparatus comprising:

- a memory writer for writing tape information and program information into the memory in the tape cassette;
- a memory reader for reading tape information and program information from the memory in the tape cassette;
- a tape reader for reading time data and a cue control signal on the tape in the tape cassette;
- a detector for detecting a program inconsistency flag in the program information area read by said memory reader;
- a detector for detecting the cue control signal recorded at a top of each recorded program read by said tape reader when said detector has detected that the program inconsistency flag had been set;
- a data corrector for correcting the program information in the program information area, as actually recorded on the tape, for a program on which the program inconsistency flag has been set, according to time data on programs already recorded on the tape; and
- a resetter for resetting the program inconsistency flag for the program on which the data corrector has corrected the program information.

10. A recording apparatus which uses a tape cassette with a memory and records a program and time data on a tape contained within the tape cassette, the memory having a program information area for storing program information on programs recorded on the tape in the tape cassette and a tape information area for storing tape information on the entire tape in the tape cassette, and the program information including a program inconsistency flag which is set or reset for each of the programs recorded on the tape in accordance with whether or not a content of a recorded program is inconsistent with the information on the recorded program on the tape, and the tape information including a tape inconsistency flag which is set or reset in accordance with whether or not the content actually recorded on the entire tape is inconsistent with the program information in the memory, said apparatus comprising:

- a memory writer for writing tape information and program information into the memory in the tape cassette;
- a memory reader for reading tape information and program information from the memory in the tape cassette;
- a detector for detecting a program inconsistency flag in the program information area read by said memory reader;
- a tape reader for reading time data on the tape in the tape cassette;
- a detector for receiving time data recorded for each program read by said tape reader on the tape and for detecting a discontinuity of the time data;
- a data corrector for correcting the program information in the program information area, as actually recorded on the tape, for a program on which the program inconsistency flag has been set, according to time data on programs already recorded on the tape; and
- a resetter for resetting the program inconsistency flag for the program on which the data corrector has corrected the program information.

\* \* \* \* \*